US012672076B2

(12) United States Patent
Canonne-Velasquez et al.

(10) Patent No.: US 12,672,076 B2
(45) Date of Patent: Jun. 30, 2026

(54) POWER HEADROOM REPORTING BY WIRELESS TRANSMIT/RECEIVE UNIT SUPPORTING SIMULTANEOUS MULTI-PANEL TRANSMISSION

(71) Applicant: InterDigital Patent Holdings, Inc., Wilmington, DE (US)

(72) Inventors: Loic Canonne-Velasquez, Dorval (CA); Afshin Haghighat, Ile-Bizard (CA); Janet Stern-Berkowitz, Little Neck, NY (US); Moon-il Lee, Melville, NY (US); Jonghyun Park, Syosset, NY (US); Paul Marinier, Brossard (CA); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/293,327

(22) PCT Filed: Jul. 27, 2022

(86) PCT No.: PCT/US2022/038562
§ 371 (c)(1),
(2) Date: Jan. 29, 2024

(87) PCT Pub. No.: WO2023/014558
PCT Pub. Date: Feb. 9, 2023

(65) Prior Publication Data
US 2026/0101290 A1 Apr. 9, 2026

Related U.S. Application Data

(60) Provisional application No. 63/249,230, filed on Sep. 28, 2021, provisional application No. 63/228,882, filed on Aug. 3, 2021.

(51) Int. Cl.
| | | |
|---|---|---|
| *H04B 7/00* | (2006.01) | |
| *H04W 52/36* | (2009.01) | |
| *H04W 72/232* | (2023.01) | |

(52) U.S. Cl.
CPC ....... *H04W 52/365* (2013.01); *H04W 72/232* (2023.01)

(58) Field of Classification Search
CPC ............ H04W 52/365; H04W 52/383; H04W 52/146; H04W 52/327; H04W 52/367; H04W 72/232
See application file for complete search history.

(56) References Cited

U.S. PATENT DOCUMENTS 11,770,775 B2 * 9/2023 Jung ................. H04W 72/0473
370/311
2019/0223117 A1 7/2019 Chai et al.
(Continued)

FOREIGN PATENT DOCUMENTS

| CN | 109219127 A | 1/2019 |
|---|---|---|
| EP | 3589034 A1 | 1/2020 |

(Continued)

OTHER PUBLICATIONS

3rd Generation Partnership Project, "Discussion on the Multi-TRP/Panel Transmission in NR", Huawei, HiSilicon, R1-1807130, 3GPP TSG RAN WG1 Meeting #93, Busan, Korea, May 21-25, 2018, 7 pages.
(Continued)

*Primary Examiner* — Tuan Pham
(74) *Attorney, Agent, or Firm* — Flaster Greenberg P.C.

(57) ABSTRACT
The disclosure pertains to a method implemented in a Wireless Transmit/Receive Unit (WTRU) for multiple Transmission and Reception Points (TRPs) Power Headroom Reports (PHRs). The method includes sending capa-
(Continued)

bility information indicating that the WTRU is configured to support simultaneous multi-panel (SMP) transmission. The method additionally includes determining that a power headroom report (PHR) has been triggered, and receiving downlink control information (DCI) comprising uplink grant information, the DCI indicating a multi-panel mode of operation. The method further includes determining one or more PH values for the PHR, wherein the one or more PH values are determined based on at least the multi-panel mode of operation indicated in the DCI and whether the PHR was triggered based on an SMP PL determination. The method also includes sending the PHR comprising the one or more PH values.

15 Claims, 8 Drawing Sheets

(56) References Cited

U.S. PATENT DOCUMENTS

| | | | | | |
|---|---|---|---|---|---|
| 2023/0284233 A1* | 9/2023 | Tran | ...................... | H04L 5/0044 |
| | | | | 370/329 |
| 2024/0107465 A1* | 3/2024 | Yuan | .................. | H04B 7/06956 |

FOREIGN PATENT DOCUMENTS

| | | |
|---|---|---|
| TW | 201808038 A | 3/2018 |
| WO | WO 2014/027941 A1 | 2/2014 |
| WO | WO 2020/168296 A1 | 8/2020 |
| WO | 2020219317 A1 | 10/2020 |

OTHER PUBLICATIONS

3rd Generation Partnership Project, "Technical Specification Group Radio Access Network, NR; Physical layer procedures for control (Release 16)", 3GPP TS 38.213. V16.5.0, Mar. 2021, 183 pages.

3rd Generation Partnership Project, "Technical Specification Group Radio Access Network, NR; Medium Access Control (MAC) protocol specification (Release 16)", 3GPP TS 38.321 V16.4.0, Mar. 2021, 157 pages.

3rd Generation Partnership Project, "Technical Specification Group Radio Access Network, NR; Radio Resource Control (RRC) protocol specification (Release 16)", 3GPP TS 38.331 V16.4.1, Mar. 2021, 949 pages.

* cited by examiner

POWER HEADROOM REPORTING BY WIRELESS TRANSMIT/RECEIVE UNIT SUPPORTING SIMULTANEOUS MULTI-PANEL TRANSMISSION

CROSS-REFERENCE TO RELATED APPLICATION(S)

This application is the 371 National Stage of International Application No. PCT/US2022/038562, filed Jul. 27, 2022, which claims the benefit of U.S. Provisional Patent Application No. 63/228,882 filed Aug. 3, 2021, and 63/249,230 filed Sep. 28, 2021, the contents of each of which are incorporated by reference herein in their entirety.

TECHNICAL FIELD

The present disclosure generally relates to wireless communications. For example, methods and apparatuses are disclosed for multiple Transmission and Reception Points (TRPs) Power Headroom Reports (PHRs).

BACKGROUND

Wireless communication systems are widely deployed to provide various telecommunication services such as telephony, video, data, messaging, and broadcasts. Representative wireless communication systems may employ multiple-access technologies that are capable of supporting communications with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may contain a number of base stations (BSs) that can support communications for a number of user equipments (UEs). A UE may communicate with a BS via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like. Multiple access technologies have been adopted in various telecommunication standards to provide a common protocol to enable different UEs to communicate on a municipal, national, regional, and/or global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and improving integration with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, improvements in LTE and NR technologies are needed as the demand for mobile broadband access continues to increase.

SUMMARY

Communications techniques and procedures are proposed for supporting scheduling decisions with PHR for multi-panel operations. For example, scheduling decisions with PHR for multi-panel operations may be achieved by furnishing a wireless transmit/receive unit (WTRU) with multiple antenna panels to provide a good signal quality to one or more TRPs regardless of UE orientation. In an embodiment, simultaneous multi-panel uplink transmissions may enable higher throughput and diversity without added latency. This mode of operation may enable a WTRU to be scheduled for transmission with more than one panel at the same time towards more than one TRP. Further, to assist with gNB scheduling decisions, a WTRU may, for example, send power headroom reports (PHR).

In an example embodiment, a WTRU may comprise a processor and memory. The processor and memory may be configured to implement any of the functionality described herein as being done or performed by the WTRU. The WTRU may send capability information indicating that the WTRU is configured to support simultaneous multi-panel (SMP) transmission. The WTRU may determine that a power headroom report (PHR) has been triggered, and may receive downlink control information (DCI) comprising uplink grant information, the DCI indicating a multi-panel mode of operation. The WTRU may also determine one or more PH values for the PHR. The one or more PH values may be determined based on at least the multi-panel mode of operation indicated in the DCI and whether the PHR was triggered based on an SMP PL determination. The WTRU may further send the PHR comprising the one or more PH values.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
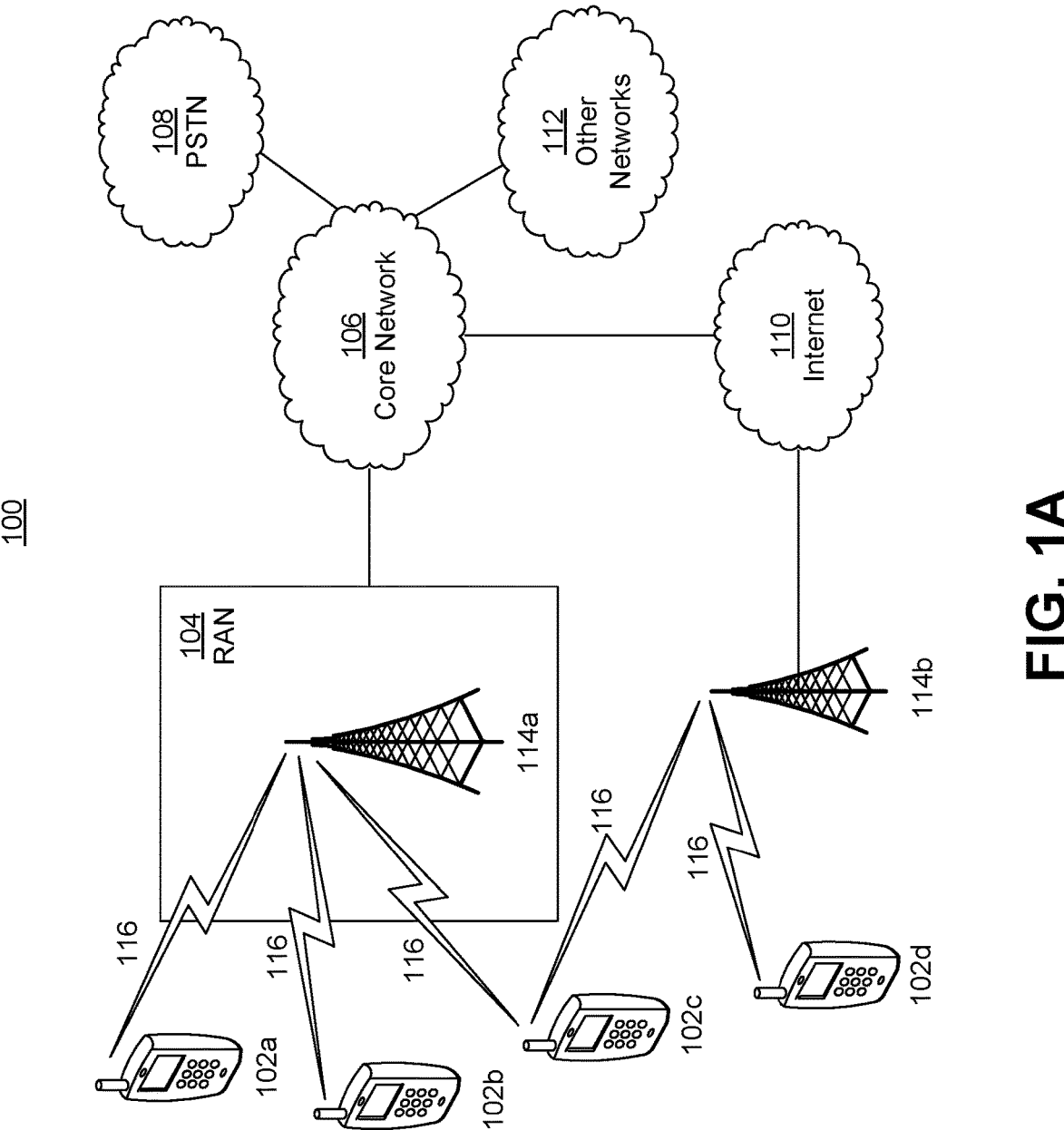
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a headmounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
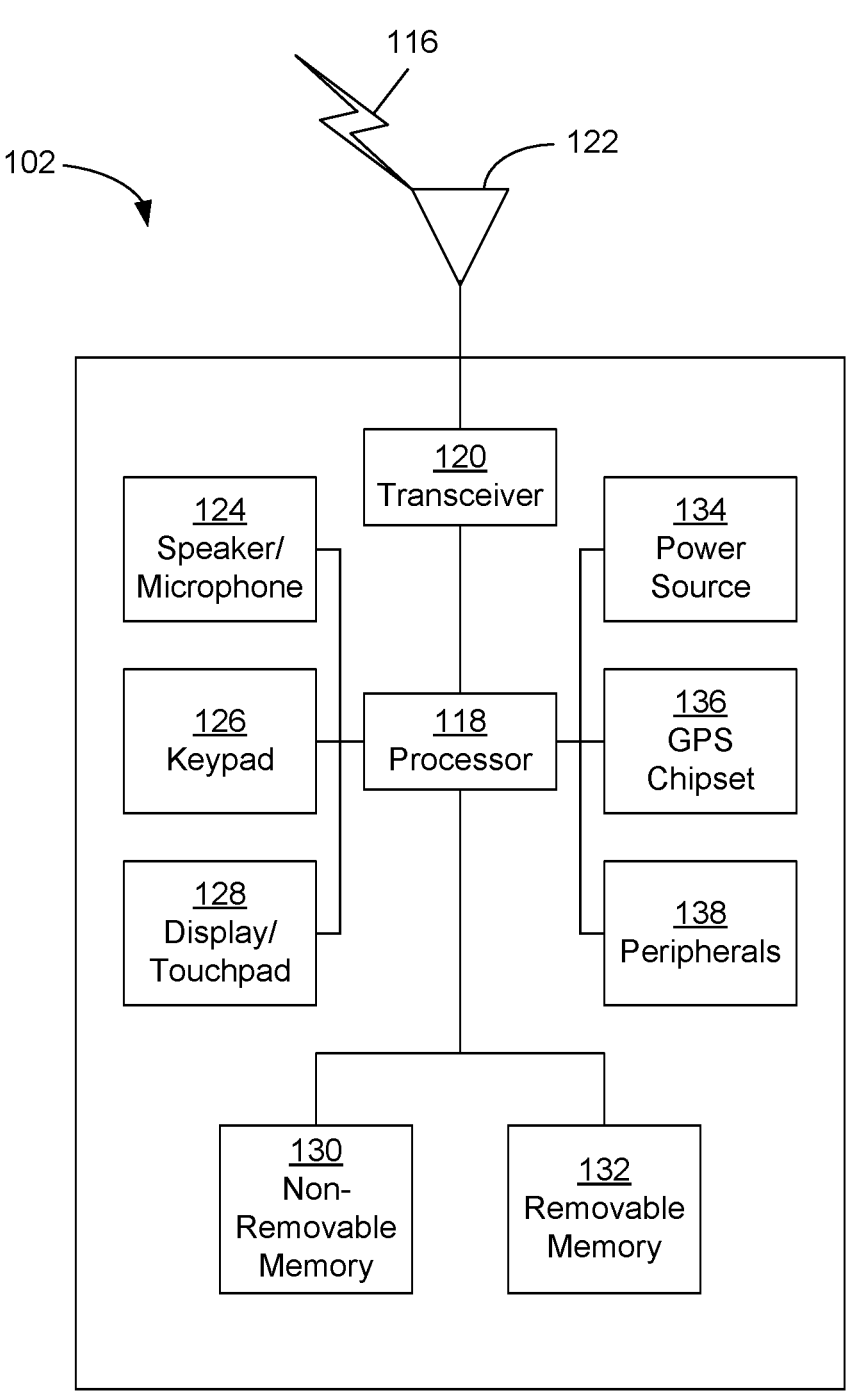
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
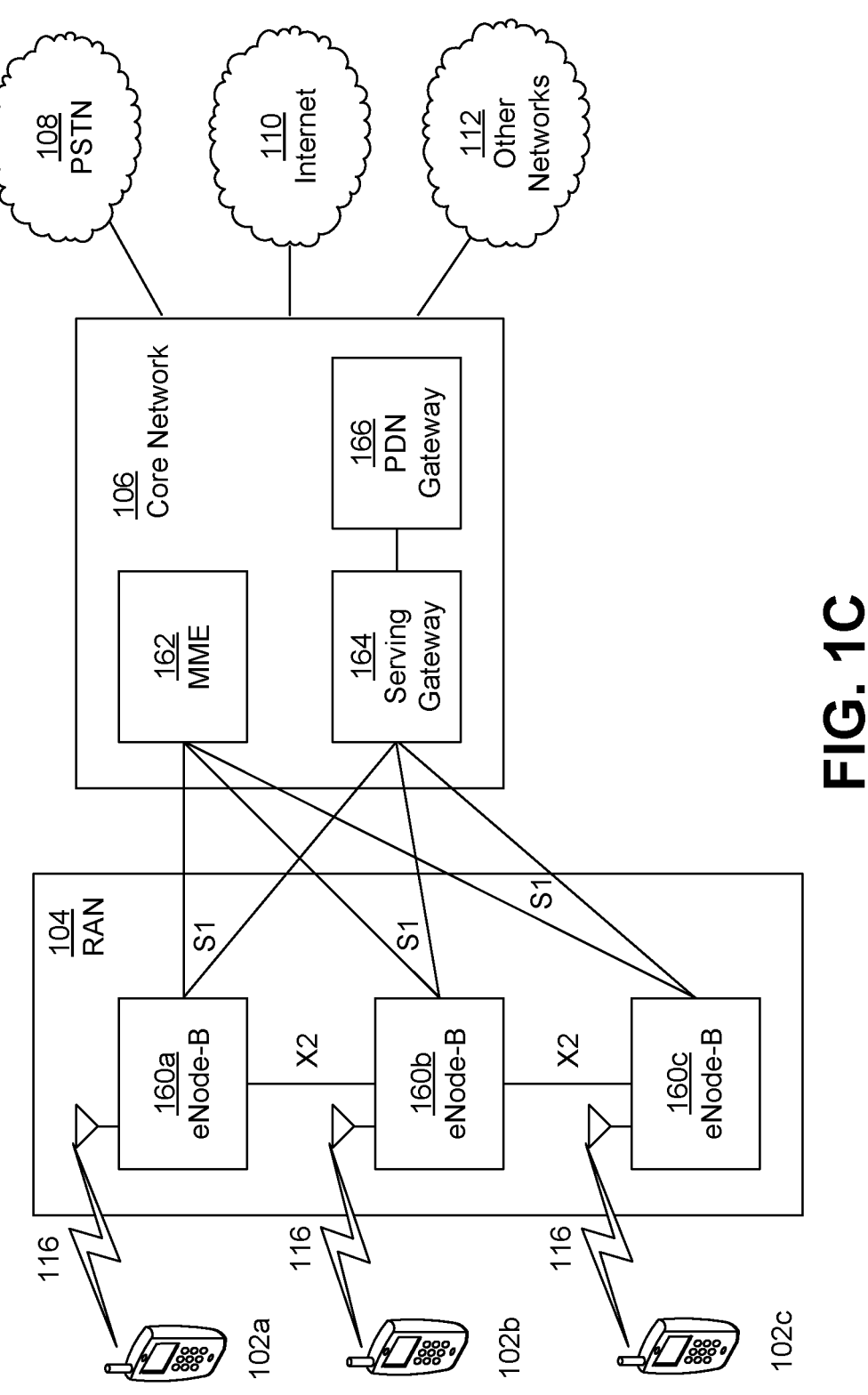
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHZ, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
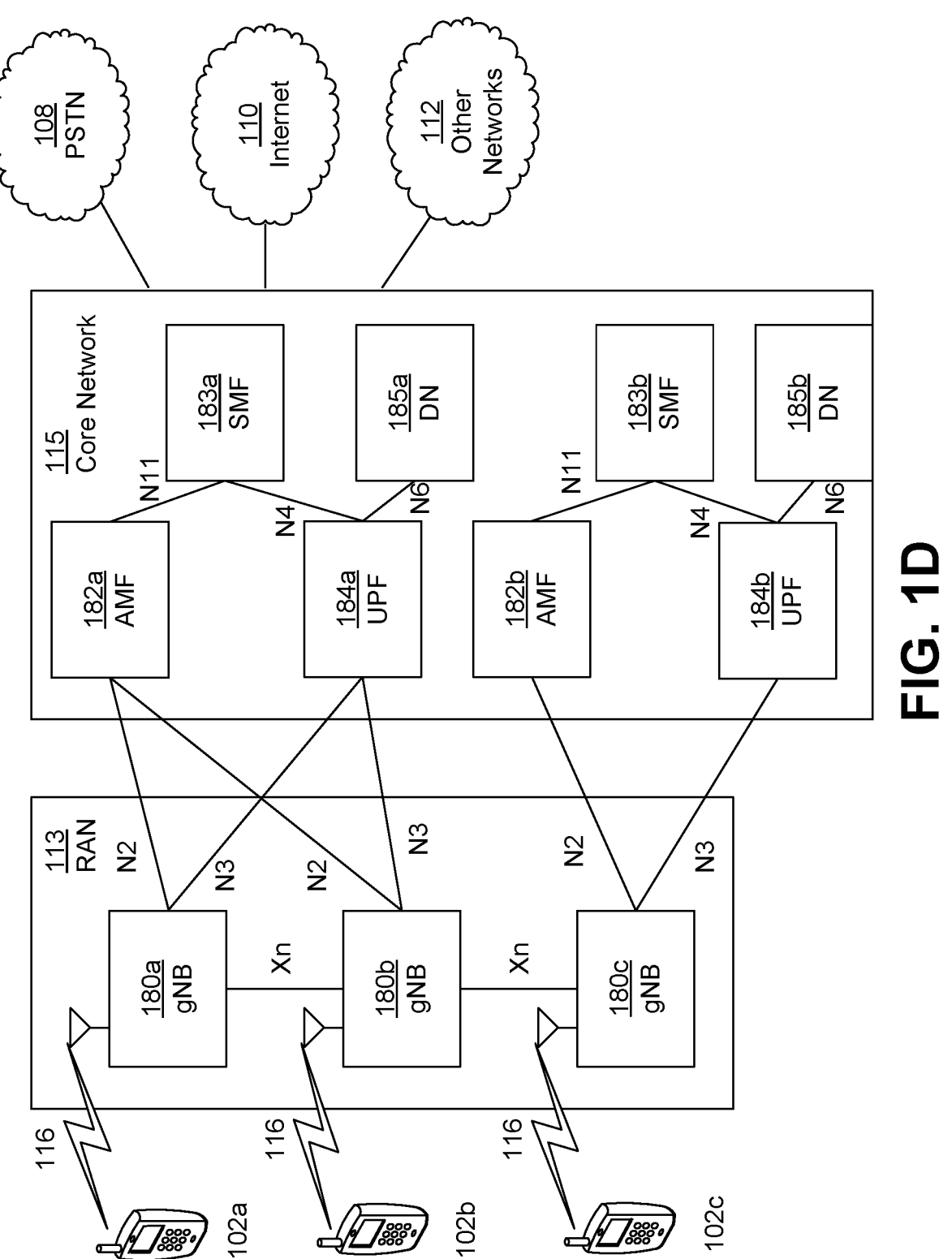
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QOS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
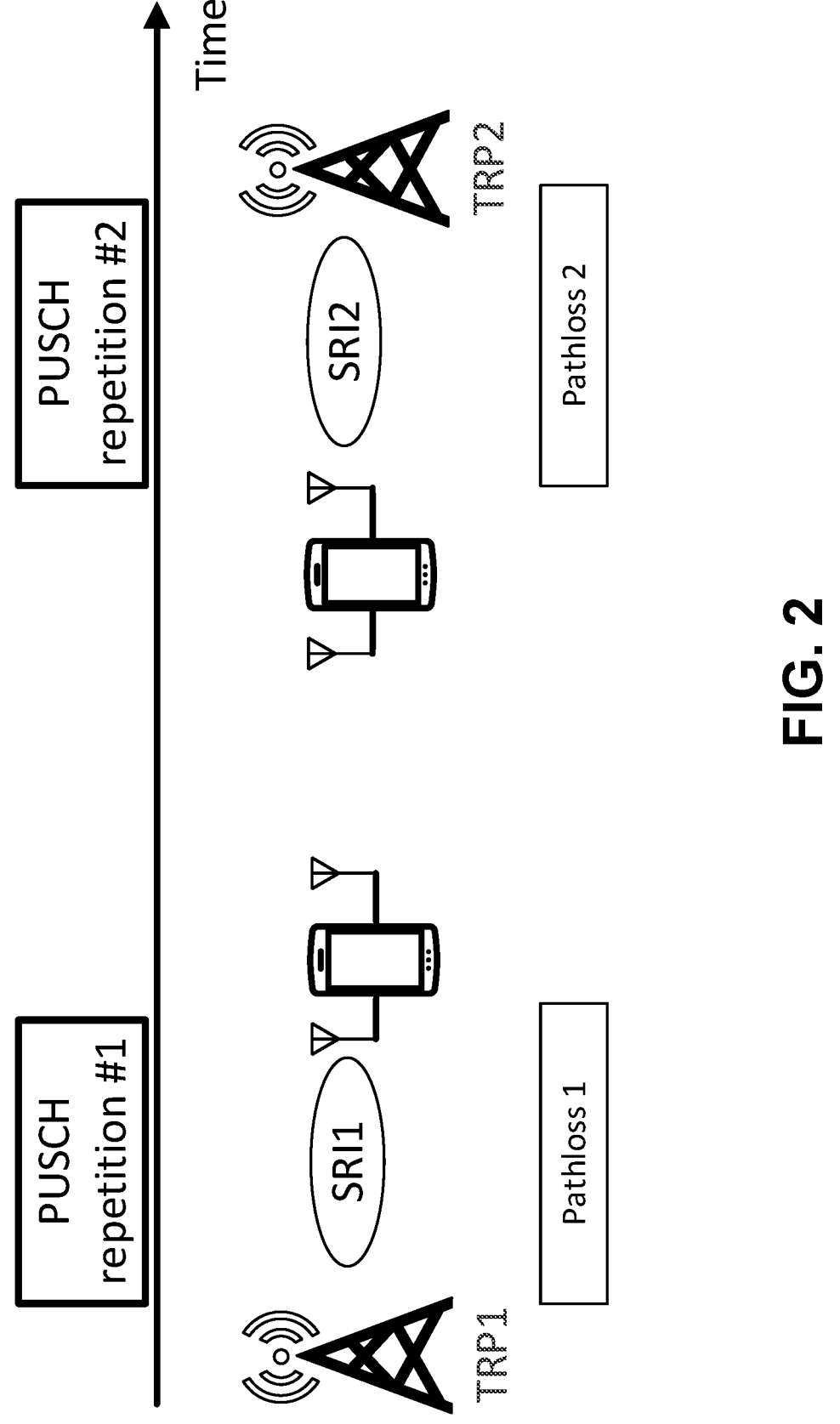
FIG. 2 is diagram illustrating an example of a single downlink control information (DCI) multiple transmission reception point (Multi-TRP) physical uplink shared channel (PUSCH) repetition.

FIG. 2 is a diagram illustrating an example of a single DCI Multi-TRP PUSCH repetition. New Radio (NR) supports uplink transmissions (e.g. physical uplink shared channel (PUSCH) transmissions) from a WTRU to one transmission reception point (TRP). For example, to assist the network in scheduling, the WTRU may send a Power Headroom Report (PHR) which may be triggered periodically. For example, the WTRU may send a Power Headroom Report (PHR) when the WTRU determines a triggering condition is met (e.g. pathloss or Power Management Maximum Power Reduction (P-MPR) varies beyond a threshold). In an example, additional enhancements may allow a WTRU to send PUSCH repetition towards multiple TRPs, as shown in FIG. 2. In an example, multiple TRPs may provide diversity in case one of the links suffers from poor channel conditions (e.g. blockage, deep fades, etc.). In an example, the DCI may be enhanced such that the repetitions are sent with different spatial filters corresponding to the different TRPs. In an example, a WTRU may maintain a power control loop per TRP (i.e. TPC commands and open loop parameters). For example, the WTRU may dynamically switch from a single TRP to a multi-TRP transmission using explicit bit fields in the DCI.

In an embodiment, an example of which may be illustrated in FIG. 2, a second service request indicator (SRI) field in the DCI may be introduced to determine the spatial filter per TRP. In an example, a second TPC field in the DCI may be optionally RRC configured (depending on WTRU capability) for closed loop adjustments per TRP. In an example, P0 may be configured per TRP. For example, P0 may be mapped to SRI-PUSCH-PowerControl if OLPC set indication is 0. In an example, if separate SRIs are available, separate PHR may be possible. In an example, P0 may be mapped to a second configured p0-PUSCH-SetList-r16 if OLPC set indication is 1. In an example, a dynamic single TRP/multiple TRP (sTRP/mTRP) switching may be introduced in DCI. For example, 2 bits may enable selection between sTRP TRP1, sTRP TRP2, mTRP starting with TRP1, and/or mTRP starting with TRP2.

In an embodiment, a WTRU may determine a power headroom (PH). In an example, WTRU may determine a PH for a cell and/or for a TRP (e.g., of or associated with a cell). In an example, a WTRU may determine the PH as the difference between a calculated power and a maximum power. In an example, the WTRU may determine the calculated power based on parameters of a grant and/or format (e.g., DCI format) such as, for example, a frequency allocation (e.g., resource block (RB) allocation). In an example, a grant may be a dynamic grant, a configured grant or a reference grant. In an example, a format may include a grant or may be a reference format. In an example, a reference grant or reference format may correspond to a specific number of RBs such as 1 RB.

In an embodiment, a WTRU may determine the calculated power is based on a pathloss (PL). In an example, a PL may be a measurement of a reference signal (RS) that may be a PL reference RS. In an example, a PL reference RS may be identified by a an RS such as a SSBRI (SSB Resource Indicator) or CRI (CSI-RS Resource Indicator). In an example, an indicator (e.g., SRS resource indicator (SRI)) may be configured with a PL reference RS as part of the SRS-Config IE. In an example, an indicator (e.g., SRI) may be provided in or with a grant (e.g., UL grant). In an example, an indicator (e.g., SRI) may be provided in a PDCCH, DCI, or DCI format in which the WTRU receives the grant. In an example, a grant may be for a PUSCH transmission.

In an embodiment, a WTRU may determine the calculated power based on one or more (e.g., accumulated) transmit power control (TPC) commands. In an example, the WTRU may receive, use, or and/or accumulate TPC commands (e.g., separately) for each cell, TRP, and/or SRI set. In an example, a cell, TRP, and/or SRI set may have or may be configured with one or more power control loops (e.g., adjustment states). In an example, the WTRU may receive, use, or and/or accumulate TPC commands (e.g., separately) for each power control loop of each cell, TRP, and/or SRI set. In an example, the power control loop to use (e.g., for a cell, TRP or SRI set) may be provided by the grant (e.g., by the SRI).

In an embodiment, there may be one or more types of PH such as PH for a PUSCH transmission (e.g., Type 1), PH for an SRS transmission (e.g., Type 3), and/or PH for simultaneous PUSCH and PUCCH transmission (e.g., Type 2). In an example, the WTRU may include PH information of one or more types for one or more cells and/or TRPs (e.g., of the one or more cells) in a PHR. In an example, a power backoff may be an applied power backoff (e.g., applied by the WTRU). In an example, a power backoff may be due to or allowed by a power management (e.g., power management maximum) power reduction (P-MPR). In an example, a power backoff may be applied to meet maximum permissible exposure (MPE) requirements. Power backoff and power reduction may be used interchangeably herein.

In an embodiment, a power headroom report (PHR) may include PH information for one or more cells. In an example, PH information may, for example, include at least one of: (i) a PH (e.g., a PH value), (ii) a maximum power (e.g., Pcmax,$_c$ or PCmax,$_{f,c}$), (iii) an indication of whether the PH value is real or virtual (e.g., V flag/indicator), (iv) a flag or indicator (e.g., P or other flag/indicator) indicating whether a power backoff (e.g., a power management power backoff or power reduction) is affecting the maximum power, and/or (v) a flag or indicator (e.g., P or other flag/indicator), and/or the like. For example, a flag or indicator may indicate whether an applied power backoff (such as, for example, P-MPR) may be less than (or greater than or equal to) a configured, specified or otherwise known value such as a value to meet maximum permissible exposure (MPE) requirements.

In an embodiment, a real PH (e.g., PH value) may be a PH (e.g., PH value) determined based on a real grant (e.g., a real UL grant) that a WTRU may receive. A real grant may be a dynamic grant (e.g., DCI based grant) or a configured grant (e.g., RRC configured or RRC configured and DCI activated). A virtual PH (e.g., PH value) may be a PH (e.g., PH value). For example, a PH may be determined based on a reference grant and/or format (e.g. based on a single RB allocation).

In an embodiment, a WTRU may trigger a PHR based on one or more conditions being satisfied. In an example, such conditions may include at least one of: (i) expiry of a timer (e.g., a periodic timer), (ii) a PL value (e.g., for a cell or TRP) has changed by more than a threshold (e.g., since the last time a PHR was transmitted), (iii) a power backoff, and/or (iv) a P-MPR (e.g., a measured P-MPR), and/or the like. In an example, a power backoff may be due to power management (e.g., as allowed by P-MPR) that, in an example, may have changed by more than a threshold. In an example, a P-MPR may be a P-MPR applied to meet MPE requirements that, in an example, may change or may have changed to be equal to or larger than a threshold (e.g., since the last time PHR was transmitted). In an example, the trigger condition that may be based on a timer expiry may be referred to herein as a periodic timer trigger. In an example, the trigger condition that may be based on PL change may be referred to herein as a PL trigger. In an example, one or both of the trigger conditions that may be related to backoff and/or P-MPR may be referred to herein as a P-MPR trigger. In an example, the trigger condition that may be related to MPE may be referred herein to as an MPE trigger herein. In an example, the thresholds for PL change and/or for power backoff change may be the same or different and may be configured (e.g., received by the WTRU such as from a gNB). In an example, the threshold may be configured separately per cell and/or TRP. The terms power backoff (e.g., as allowed by P-MPR), P-MPR backoff, and/or P-MPR may be used interchangeably herein. In an example, a WTRU may transmit a PHR when or after the WTRU triggers a PHR.

In an embodiment, a PHR transmission may include a multi-TRP transmission. In an example, the WTRU may transmit a PHR in a MAC CE and/or in a transport block (TB). In an example, the WTRU may include a PHR MAC CE in a TB. In an example, the WTRU may transmit a TB or a PHR in a PUSCH. In an example, the WTRU may include a MAC CE or TB that may include a PHR in PUSCH transmission. In an example, a PUSCH transmission may include one or more of data, UL control information (UCI) and/or one or more MAC CEs, and/or the like. In an example, a TB may include data, one or more MAC CEs, and/or the like. In an example, when a WTRU transmits a TB to multiple TRPs (e.g., based on a grant for multi-TRP transmission) and the TB includes a PHR or a MAC CE that includes a PHR, the PHR (e.g., the same PHR) may be transmitted to the multiple TRPs. In an example, when a WTRU transmits a TB in multiple PUSCH transmissions, for example, based on respective SRI sets (e.g., based on a grant including an SRI for each of multiple SRI sets), and the TB includes a PHR or a MAC CE that includes a PHR, the PHR (e.g., the same PHR) may be transmitted in the multiple PUSCH transmissions. In an example, the PH information that a WTRU includes in a PHR may depend on when a PHR is triggered and/or what resource(s) are available for transmitting the PHR.

In an embodiment, in a deployment scenario with multiple TRPs and/or cells, each WTRU-TRP link may have its own pathloss. In an example, WTRU-TRP link may comprise a WTRU that may require different transmission powers towards different TRPs. In an example, separate PHRs may need to be triggered for each TRP. In an example, the WTRU may need to report one or more than one PHR. In an example, multiple PHRs may be triggered for the different TRPs, for example, to determine how to calculate (e.g. real or virtual) the multiple-TRP PH levels. In an example, multiple PHRs may be triggered for the different TRPs, for example, to determine how to report multiple PHRs. In an example, simultaneous multi-panel uplink transmission may be enabled, for example, in the PHR procedure. In an example, the PHR triggering and/or reporting procedure may require enhancements.

In an embodiment, an aspect of PHR in multi-TRP and/or multi-cell deployment that may considered may be triggering rules per reference signal (RS) group for multi-TRP (e.g., pathloss, P-MPR, and pathloss difference between RS groups). In an embodiment, an aspect of PHR in multi-TRP and/or multi-cell deployment that are considered may be PHR Reporting rules for intra- and inter-cell cases (e.g., mTRP mode determination, single vs multiple PH level reporting, medium access control-control element (MAC-CE) enhancements). In an embodiment, an aspect of PHR in multi-TRP and/or multi-cell deployment that are considered may be PHR in the simultaneous UL multi-panel (STxMP) transmission to mTRP (e.g., STxMP mode determination, STxMP PHR calculation).

In an embodiment, triggering rules for multi-TRP may be defined. For example, one triggering rule may be that a WTRU may be configured with (or may receive a configuration of) one or more transmit receive points (TRP) to which the WTRU may transmit and/or from which the WTRU may receive. In an example, the WTRU may be configured with one or more TRPs for one or more cells. For example, a cell may be a serving cell. In an embodiment, one triggering rule may be that a WTRU may be configured with (or receive configuration of) one or more pathloss (PL) reference groups (e.g., sets) and/or one or more SRS groups, SRS resource indicator (SRI), SRS resource sets, and/or the like. In an embodiment, one triggering rule may be that a PL reference group may correspond to or may be associated with a TRP. In an example, a PL reference group may include, identify, correspond to, and/or be associated with one or more TCI states, SRIs, reference signal sets (e.g. CSI-RS set, SRI sets), CORESET index, reference signals (e.g. CSI-RS, SSB), and/or the like. In an embodiment, one triggering rule may be that a WTRU may receive a configuration (e.g., any configuration described herein). In an example, the configuration may be received from a gNB or TRP. For example, the WTRU may receive configuration of one or more TRPs, one or more PL reference groups and/or one or more SRI sets. In an example, a WTRU may implicitly determine an association between a RS set/group and a TRP. As an example, if the WTRU is configured with two SRS resource sets, then the WTRU may determine to transmit to TRP1 with SRS in the first resource set, and to TRP2 with SRS in the second resource set. In an example, the configuration may be via RRC signaling. In the examples and embodiments described herein, TRP, PL reference group, SRI group, and SRI set may be used interchangeably. The terms set and group may be used interchangeably herein.

In an embodiment, a property of a grant or assignment may be comprised of at least one of the following: a frequency allocation; an aspect of time allocation, such as a duration; a priority; a modulation and coding scheme; a transport block size; a number of spatial layers; a number of transport blocks; a TCI state, CRI or SRI, wherein a TCI state, CRI, or SRI may be for each WTRU's panel if multiple panels are used for a UL transmission; a number of repetitions; whether the repetition scheme is Type A or Type B; whether the grant is a configured grant type 1, type 2 or a dynamic grant; whether the assignment is a dynamic assignment or a semi-persistent scheduling (configured) assignment; a configured grant index or a semi-persistent assignment index; a periodicity of a configured grant or assignment; a channel access priority class (CAPC); and/or any parameter provided in a DCI, by MAC or by RRC for the scheduling the grant or assignment. The grant or assignment may indicate whether the grant is for single-TRP transmission or multi-TRP transmission; and/or whether the grant is for UL transmission from single WTRU panel (TxSP) or simultaneous UL transmission from multiple WTRU panels (STxMP).

In an embodiment, a WTRU may receive or be configured with a grant (e.g., an UL grant) for at least one transmission (e.g. PUSCH). In an example, a transmission may be to one TRP or to more than one TRP. In an example, the WTRU may determine the spatial filter to use for a PUSCH transmission, which may be based on the grant which may include one or more indicators (e.g., SRIs). In an example, the grant may include an indication of the one or more TRPs, for example, via an SRI for each of the one or more TRPs. In an example, the WTRU may determine the association between an SRI and a TRP, for example, through the ordering of SRIs in the grant (e.g. first SRI is TRP1, and second SRI is TRP2). In an example, the WTRU may transmit a PUSCH for each of the indicated SRI or TRP, for example in response to the grant. In an example, the WTRU may transmit or include a TB (e.g., the same TB), for example, in each of the transmissions (e.g., for each of the SRIs or to each of the TRPs). In an example, an SRI may be associated with or correspond to a reference signal (RS). In an example, an RS may be or correspond to a CSI-RS or an SSB (e.g., SSS of an SSB). In an example, the WTRU may use an (e.g., each) SRI to determine the transmit spatial filter (i.e. direction of the beam at the WTRU's antenna), for example, to use for the respective transmission. In an example, a grant may be for a single transmission for each of the indicated SRIs or TRPs or for multiple (e.g., repeated) transmissions for each of the indicated SRIs or TRPs. In an example, the same TB may be transmitted in each of the multiple transmissions.

In an embodiment, a WTRU may receive, e.g., in a grant, a first SRI (e.g., a first SRI index) and a second SRI (e.g., SRI index). In an example, the first SRI may be an SRI from a first SRS resource set and the second SRI may be from a second SRS resource set. In an example, the first SRI set may correspond to a first TRP and the second SRI set may correspond to a second TRP. In an example, the WTRU may transmit a first PUSCH based on the first SRI and/or to the first TRP. In an example, the WTRU may transmit a second PUSCH based on the second SRI and/or to the second TRP. In an example, SRI may be used herein as a non-limiting example of an indicator. In an example, another indicator may be used and still be consistent with the embodiments and examples described herein.

In an embodiment, a property of the data included in a transport block (TB) may refer to any parameter configuring a logical channel or radio bearer for which data may be included in the TB. For example, parameter(s) configuring a logical channel or radio bearer comprise a logical channel priority, prioritized bit rate, logical channel group, RLC mode, and/or the like. In an example, a property of a grant or assignment may also refer to a property of the data that may be included in the corresponding TB.

In an embodiment, an indication by DCI may comprise: an explicit indication by a DCI field or by RNTI used to mask CRC of the PDCCH; or an implicit indication by a property such as DCI format, DCI size, Coreset or search space, Aggregation Level, first resource element of the received DCI (e.g., index of first Control Channel Element), where the mapping between the property and the value may be signaled by RRC or MAC.

In an embodiment, a WTRU may transmit or receive a physical channel or reference signal according to at least one spatial domain filter (or "spatial filter"). For example, the term "beam" may be used to refer to a spatial domain filter.

In an example, the WTRU may transmit a physical channel or signal using the same spatial domain filter as the spatial domain filter used for receiving an RS (such as CSI-RS) or a SS block. In an example, the WTRU transmission may be referred to as "target", and the received RS or SS block may be referred to as "reference" or "source". In such case, for example, the WTRU may transmit the target physical channel or signal according to a spatial relationship, for example, with a reference to the RS or SS block.

In an example, the WTRU may transmit a first physical channel or signal according to the same spatial domain filter as the spatial domain filter used for transmitting a second physical channel or signal. In an example, the first and second transmissions may be referred to as "target" and "reference" (or "source"), respectively. In such case, for example, the WTRU may be said to transmit the first (target) physical channel or signal according to a spatial relation with a reference to the second (reference) physical channel or signal.

In an example, a spatial relation may be implicit, configured by RRC or signaled by MAC CE or DCI. For example, a WTRU may implicitly transmit PUSCH and DM-RS of PUSCH according to the same spatial domain filter as an SRS indicated by a SRI indicated in DCI or configured by RRC. In an example, a spatial relation may be configured by RRC for an SRS resource indicator (SRI) or signaled by MAC CE for a PUCCH. In an example, the spatial relation may also be referred to as a "beam indication".

In an example, a spatial relation may be configured with parameters such as a resource used as pathloss reference, at least one power offset (P0) and an index to a closed loop adjustment. In an example, the parameters may be applicable to setting of transmission power for the physical channel or signal when transmitted according to the spatial relation.

In an example, the WTRU may receive a first (target) downlink channel or signal according to the same spatial domain filter or spatial reception parameter as a second (reference) downlink channel or signal. For example, an association may exist between a physical channel such as PDCCH or PDSCH and its respective DM-RS. In an example, when the first and second signals are reference signals, an association may exist between a physical channel such as PDCCH or PDSCH and its respective DM-RS when the WTRU is configured with a quasi-colocation (QCL) assumption type D between corresponding antenna ports. In an example, an association between a physical channel such as PDCCH or PDSCH and its respective DM-RS may be configured as a TCI (transmission configuration indicator) state. In an example, a WTRU may be indicated with an association between a CSI-RS or SS block and a DM-RS by an index to a set of TCI states configured by RRC and/or signaled by MAC CE. In an example, such indication may also be referred to as a "beam indication".

In an embodiment, pathloss-based triggering may be performed per RS group (i.e. TRP). In one embodiment, a WTRU may determine to trigger a PHR based on a pathloss difference larger than a threshold, where, for example, the pathloss difference may be measured on pathloss reference RSs, which may be associated with the same RS group. In an example, the WTRU may be configured with multiple pathloss reference RS, and the WTRU may measure a pathloss per pathloss reference RS. In an example, a set of pathloss reference RS may be associated with an RS group. In an example, the WTRU may measure pathloss differences for pathloss reference RS that belong to the same group, and the PHR may be triggered if, for example, the pathloss difference measured between RS within the same group goes above a threshold. In an example, the WTRU may be enabled to track the pathloss variation per TRP (i.e. RS group), and the WTRU may independently determine when to trigger a PHR per TRP (i.e. RS group).

In an embodiment, a multi-TRP PHR may be triggered if phr-ProhibitTimer expires or has expired and the path loss has changed more than phr-Tx-PowerFactorChange dB for at least one active RS group of at least one activated Serving Cell of any MAC entity. In an example, the active DL BWP of the at least one activated Serving Cell of any MAC entity may be a not dormant BWP which, in an example, may be used as a pathloss reference since the last transmission of a PHR in this MAC entity when the MAC entity may have UL resources for new transmission. In an embodiment, a multi-TRP PHR may be triggered if the path loss variation for the RS group of one cell assessed above is between the pathloss measured at present time on the current pathloss reference of the RS group and the pathloss measured at the transmission time of the last transmission of PHR on the pathloss reference of the RS group in use at that time, which may be irrespective of whether the pathloss reference has changed in between. In an example, the current pathloss reference for this purpose may not include any pathloss reference configured using pathlossReferenceRS-Pos.

In an embodiment, a pathloss threshold may be configured per RS group (e.g. a threshold configured per TRP as part of the PHR-Config IE). In an embodiment, a pathloss threshold may be configured for more than one RS group (e.g. one threshold for all TRPs within a cell).

In an embodiment, the WTRU may determine or may be configured with the RS group based on a configuration of a set of reference signals or spatial filters (e.g. SRS, CSI-RS, SSB, TCI states). For example, a WTRU may be configured with a first SRS resource set consisting of SRI1 and SRI2 to TRP1, and a second SRS resource set consisting of SRI3 and SRI4 to TRP2. RS group 1 may consist of SRS resource set 1, whereas RS group 2 may consist of SRS resource set 2. In an embodiment, the WTRU may determine or may be configured with the RS group implicitly based on the SRI's position in the multi-TRP DCI. In an example, when the DCI is configured with two SRIs, a WTRU may determine that the first indicated SRI in the DCI may belong to RS group 1, and the second indicated SRI may belong to RS group 2. In an embodiment, the WTRU may determine or may be configured with the RS group based on determining the CORESET ID or CORESETpoolindex association of the PDCCH where the WTRU received the DCI, and the WTRU may determine that the RSs associated with the same CORESET ID or CORESETpoolindex may correspond to RSs within the same RS group. In an embodiment, the WTRU may determine or may be configured with the RS group based on determining that RSs configured or associated to a panel may be associated to an RS group. For example, a WTRU may send to TRP1 with panel 1, and to TRP2 to panel 2. Then, for example, the WTRU may determine that any SRI sent from panel 1 is associated to RS group 1, and any SRI sent from panel 2 is associated to RS group 2.

Figure 3:
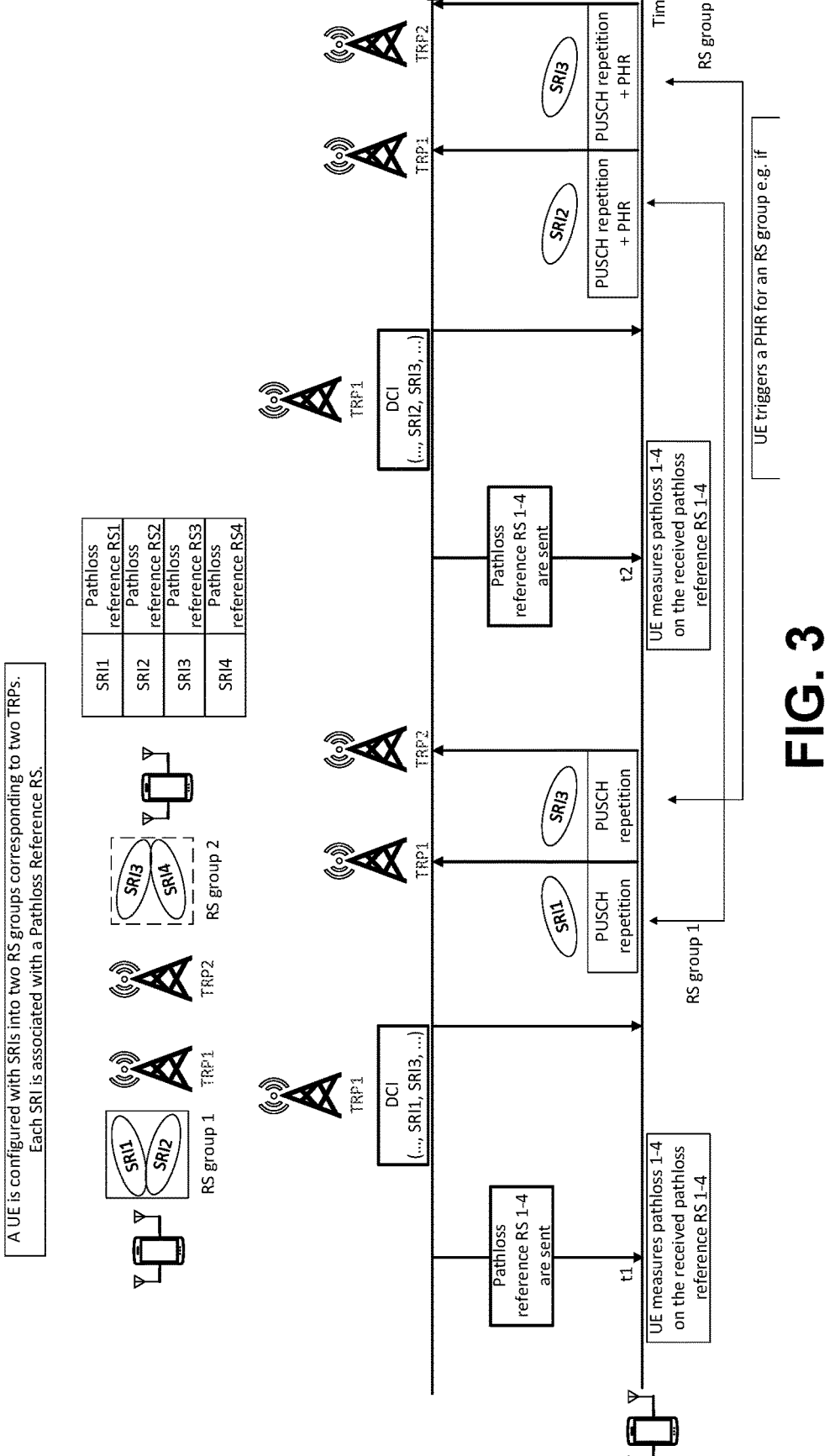
FIG. 3 is a diagram illustrating an example of power headroom report (PHR) triggering with two reference signal (RS) groups.

FIG. 3 is a diagram illustrating an example of PHR triggering with two RS groups. In an embodiment, the WTRU may be configured with two RS groups where each RS group may consist of two SRIs. In an example, each SRI may be configured as part of SRS-Config with a Pathloss-ReferenceRS. In an example, the TRPs may send the Path-lossReference RSs 1-4 and the WTRU may receive them where it may perform pathloss measurements 1-4 at time t1, and similarly at a later time t2. In an example, the WTRU may determine that the DCI schedules the WTRU with SRI1 from RS group1, and SRI3 from RS group 2. In an example, on the next transmission, the WTRU may determine that the DCI schedules the WTRU with SRI2 from RS group1, and SRI3 from RS group2. In an example, the WTRU may measure the pathloss difference between RSs in group1 (pathloss1(t1) and pathloss2(t2)), and between RSs in group 2 (pathloss3(t1) and pathloss3(t2)). In an example, if the difference is above a threshold, the WTRU may trigger a PHR. In an example, the WTRU may include the PHR in the PUSCH resources on the next scheduled transmission.

In an embodiment, if a PHR is triggered through the pathloss difference, the WTRU may calculate the PHR for the TRP associated to the RS group. In an example, the WTRU may determine the resource allocation for the PUSCH transmission to the triggered TRP from the multi-TRP grant. In an example, the WTRU may calculate the real PHR for the triggered TRP and may include the PHR in the PUSCH transmission. In an example, if no grant is available but the PHR still triggered for a TRP, the WTRU may calculate a virtual PHR based on a reference resource allocation (e.g. 1 RB). In an example, the WTRU may transmit the PHR on the next available PUSCH transmission to the TRP that is triggered.

In an embodiment, an RS group may be preconfigured with a set of RS. In an example, a subset of RS may be dynamically activated through a MAC-CE where the MAC-CE may contain indices of RSs to activate/deactivate (e.g. RS index and a flag indicating 1 or 0). In an example, more than one RS group may be associated to a TRP. In an example, one RS group may be active at a time. In an example, one RS group may be activated through MAC-CE while other RS groups are inactive.

In an embodiment, the P-MPR trigger may be configured, monitored, or derived per RS group. In an example, a multi-TRP PHR may be triggered if phr-ProhibitTimer expires or has expired. In an example, a multi-TRP PHR may be triggered if phr-ProhibitTimer expires or has expired, when the MAC entity has UL resources for new transmission. In an example, a multi-TRP PHR may be triggered if phr-ProhibitTimer expires or has expired, when the MAC entity has UL resources for new transmission, and the following is true for any of the activated Serving Cells of any MAC entity with configured uplink: there are UL resources allocated for transmission or there is a PUCCH transmission on this cell. In an example, a multi-TRP PHR may be triggered if phr-ProhibitTimer expires or has expired, when the MAC entity has UL resources for new transmission, and the following is true for any of the activated Serving Cells of any MAC entity with configured uplink: the required power backoff due to power management (as allowed by P-MPRc as specified in TS 38.101-1, TS 38.101-2, and TS 38.101-3) for an RS group of this cell has changed more than phr-Tx-PowerFactorChange dB since the last transmission of a PHR when the MAC entity sent a real PH for the RS group for the cell. In an example, a multi-TRP PHR may be triggered if phr-ProhibitTimer expires or has expired, when the MAC entity has UL resources for new transmission, and the following is true for any of the activated Serving Cells of any MAC entity with configured uplink: MAC entity had UL resources allocated for a transmission or a PUCCH transmission on an RS group in this cell. In an example, a multi-TRP PHR may be triggered if phr-ProhibitTimer expires or has expired, when the MAC entity has UL resources for new transmission, and the following is true for any of the activated Serving Cells of any MAC entity with configured uplink: there are UL resources allocated for transmission or there is a PUCCH transmission on this cell; the required power backoff due to power management (as allowed by P-MPRc as specified in TS 38.101-1, TS 38.101-2, and TS 38.101-3) for an RS group of this cell has changed more than phr-Tx-PowerFactorChange dB since the last transmission of a PHR when the MAC entity sent a real PH for the RS group for the cell; and MAC entity had UL resources allocated for a transmission or a PUCCH transmission on an RS group in this cell.

In an embodiment, a WTRU may trigger a PHR when one or more of the following is true: (i) there is a real transmission (e.g., PUSCH or PUCCH) on, to, or for a TRP (e.g., of a cell) and/or (ii) a power backoff (e.g., due to power management) for the TRP (e.g., of the cell) has changed more than a threshold amount since the last transmission of a PHR when a real PH was included for the TRP (e.g., of the cell).

In an embodiment, a WTRU may trigger a PHR when one or more of the following is true (i) there is a real transmission (e.g., PUSCH or PUCCH) on, to, or for a TRP (e.g., of a cell) that may result in a real PH transmission for the TRP and/or (ii) a power backoff (e.g., due to power management) for the TRP (e.g., of the cell) has changed more than a threshold amount since the last transmission of a PHR when a real PH was sent for the TRP (e.g., of the cell).

In an embodiment, a WTRU may trigger a PHR when one or more of the following is true: (i) there are resources allocated for UL transmission or a PUCCH transmission for a TRP (e.g., of a cell), for example that may result in a real PH transmission for the TRP and/or (ii) a power backoff (e.g., due to power management) for the TRP (e.g., of the cell) has changed more than a threshold amount since the last transmission of a PHR when a real PH was included for the TRP (e.g., of the cell).

In an embodiment, a cell may be a serving cell, an activated cell or an activated serving cell. In an example, a cell may be a cell with configured UL. In an example, a power backoff may be a required power backoff or an applied power backoff. In an example, the power backoff may be due to power management, for example, as allowed by P-MPR. In an example, P-MPR may be for the cell and/or for the TRP. In an example, power backoff and/or P-MPR (e.g., allowed PMPR or maximum P-MPR) may be cell specific or TRP specific. In an example, the threshold may be received from a TRP or gNB. In an example, the WTRU may receive configuration of the threshold for example from a TRP or gNB. In an example, the threshold may be in dB. In an example, the threshold may, for example, be called phr-Tx-PowerFactorChange. The terms "on a TRP", "to a TRP" and "for a TRP" may be used interchangeably herein.

In an example, the WTRU may or may only trigger a PHR when a timer (e.g., phr-ProhibitTimer) expires or has expired, for example when a MAC entity has UL resources for new transmission. In an example, there may be a real transmission to a TRP when there are UL resources allocated for transmission for the TRP (e.g., via a dynamic or configured grant) or when there is a PUCCH transmission to or for the TRP. In an example, the resources allocated for UL transmission may be allocated by a single-TRP grant or a multi-TRP grant.

In an example, a WTRU may or may only trigger a PHR when the TRP for which the power backoff changed by more than a threshold is the TRP for which the resources are allocated for UL transmission, for example, when the allocation is based on a single TRP grant.

In an example, a WTRU may or may only trigger a PHR for the first TRP of a multi-TRP grant. In an example, a WTRU may or may only trigger a PHR when the TRP for which the power backoff changed by more than a threshold is the first TRP for which the resources are allocated for UL transmission, for example, when the allocation is based on a multi-TRP grant. In an example, the first TRP may be the TRP with the earliest allocated resources. The terms P-MPR and PMPRc may be used interchangeably herein.

In an example, a power backoff change may be a change in power backoff greater than a threshold. In an example, a WTRU may or may only trigger a PHR for a cell, for example for a power backoff change for a TRP of the cell, for example, when there are UL resources for new transmission and/or UL resources for a first transmission of a TB on the cell. This may, for example, ensure that the WTRU sends the PHR on the cell. In an example, the WTRU may send the PHR to at least one of the TRPs (e.g., each of the TRPs) of the cell.

In an example, a WTRU may or may only trigger a PHR for a cell, for example for a power backoff change for a TRP of the cell, for example when there are UL resources for new transmission and/or UL resources for a first transmission of a TB on the cell, for example when the WTRU has UL resources allocated for the cell and a multi-TRP grant is used to allocate the resources. In an example, a new trigger may be based on a difference between PHRs or pathloss of two different RS groups.

In an embodiment, a WTRU may trigger a PHR when the PHR or pathloss difference between RS groups is larger than a threshold. For example, a WTRU may determine that RS group 1 may use pathloss reference RS1 to measure pathloss 1, and RS group 2 may use pathloss reference RS2 to measure pathloss 2. Then, for example, the WTRU may trigger a PHR if the WTRU determines that the pathloss difference between pathloss 1 and pathloss 2, Δ, is above a threshold. In an example, the RS groups may be located in the same cell in which case the pathloss difference is measured intra-cell. In an example, the two RS groups may be associated to different cells in which case the pathloss difference is measured inter-cell. In an example, the WTRU may be configured with different thresholds for the intra-cell and inter-cell case. In an example, the PHR may be triggered if either the intra-cell or the inter-cell pathloss difference is above a threshold.

In an embodiment, the WTRU may determine to trigger a PHR when the pathloss difference between RS groups changes by more than a threshold. For example, a WTRU may measure the pathloss difference, Δ1, at time t1. For example, at a later time t2>t1, the WTRU may measure the pathloss difference Δ2. For example, the WTRU may trigger a PHR if Δ1-Δ2 is larger than a threshold. In an embodiment, the WTRU may determine to trigger a PHR when the difference in PHRs is larger than a threshold. For example, a WTRU may calculate two PH levels based on the grant, PHR1 and PHR2. For example, if PHR1-PHR2 is larger than a threshold, a WTRU may be triggered to report both PHRs. In an embodiment, the WTRU may determine to trigger a PHR if one of the calculated PHRs is larger than a threshold (e.g. if a PHR is negative). In an example, the network may receive a PHR triggered by one of these embodiments. In an example, the network may determine that one of the RS groups may no longer be suitable for multi-TRP transmission (e.g. because the pathloss or PHR difference is large). In an example, the network may switch the RS group or TRPs used in the next multi-TRP grant.

In an embodiment, PHR reporting rules for intra- and inter-cell mTRP may be specified. In an embodiment, a WTRU may dynamically switch between single and multi-TRP transmission. In an example, the dynamic indication may be provided by the grant. In an example, the grant may indicate whether the PUSCH is transmitted to TRP1 only, TRP2 only, TRP1 then TRP2, or TRP2 then TRP1. In an example, enhancements to PHR may consider different indicated sTRP/mTRP cases depending on whether a single or multiple TRPs triggered the PHR, whether to report a single or multiple PHRs, how to report the PHRs, whether the TRPs are intra- or inter-cell, and/or the like. The terms WTRU and MAC entity may be used interchangeably herein.

In an embodiment, a WTRU may trigger a PHR (e.g., based on one of the trigger conditions described herein). In an example, a WTRU may transmit a PHR when the WTRU has UL resources for new transmission (e.g., that can accommodate the PHR MAC CE). In an example, or a (e.g., each) cell (e.g., serving cell or activated serving cell), the WTRU may determine whether to include a real PH value (e.g., based on a real grant or transmission) or a virtual PH value (e.g., based on a reference format).

In an embodiment, the WTRU may include a real PH value for a cell (e.g., a serving cell or activated serving cell) when the WTRU has grant information available for the cell. In an example, the WTRU may consider or determine grant information to be available, for example when the WTRU receives the grant information (e.g., the DCI including the grant information) after the PHR is triggered (or at the time the PHR is triggered) and before or at the time the WTRU receives the grant or DCI information for the PUSCH in which the WTRU may send (or sends) the PHR. In an example, the WTRU may include a virtual PH or no PH in the PHR for the TRP or cell when a real grant is not considered available for the cell or TRP.

In an example, a WTRU or MAC-entity may determine whether a PH value for an activated Serving Cell is based on real transmission or a reference format by considering configured grant(s) (e.g., higher layer signaling of configured grant(s)) and/or downlink control information which may have been received until and including the PDCCH occasion in which the first UL grant for a new transmission that can accommodate the MAC CE for PHR (e.g., as a result of logical channel prioritization (LCP)) may be received since a PHR has been triggered, for example if the PHR MAC CE is reported on an uplink grant received on the PDCCH or until the first uplink symbol of PUSCH transmission minus a PUSCH preparation time, for example if the PHR MAC CE is reported on a configured grant.

In an example, a WTRU may consider a grant available when the grant occurs between a PHR trigger and the time (e.g., PDCCH monitoring occasion), for example when the WTRU monitors for or receives a grant (e.g., UL grant) for a PUSCH in which the WTRU transmits or may transmit the PHR (e.g., the PHR associated with the PHR trigger). In an example, between the trigger and the monitoring time may include at the time of the trigger and/or at the time of the monitoring time.

For example, when the WTRU receives a grant (e.g., UL grant) for N (e.g., 2) TRPs, the WTRU may include a real PH for at least one of (e.g., each of) the N TRPs, for example when the multi-TRP grant is received at or after the time (e.g., since) a PHR trigger occurs and before or at the time (or PDCCH occasion) when the WTRU monitors for or receives a grant (e.g., UL grant) for a PUSCH in which the WTRU may transmit the PHR (e.g., the PHR associated with the PHR trigger).

In an example, the WTRU may include a virtual PH for at least one of (e.g., each of) the N TRPs, for example when the multi-TRP grant is received before a PHR trigger occurs or after the time (or PDCCH occasion) when the WTRU monitors for or receives a grant (e.g., UL grant) for a PUSCH in which the WTRU may transmit the PHR (e.g., the PHR associated with the PHR trigger).

In an example, time between two events or time occasions may include the time of the one or more of the events or time occasions. In an example, an event may be a PHR trigger. In an example, n event may be the monitoring for or receiving a grant. In an example, a time may be a time occasion. In an example, a time occasion may be a PDCCH occasion, for example for monitoring for or receiving a grant.

Figure 4:
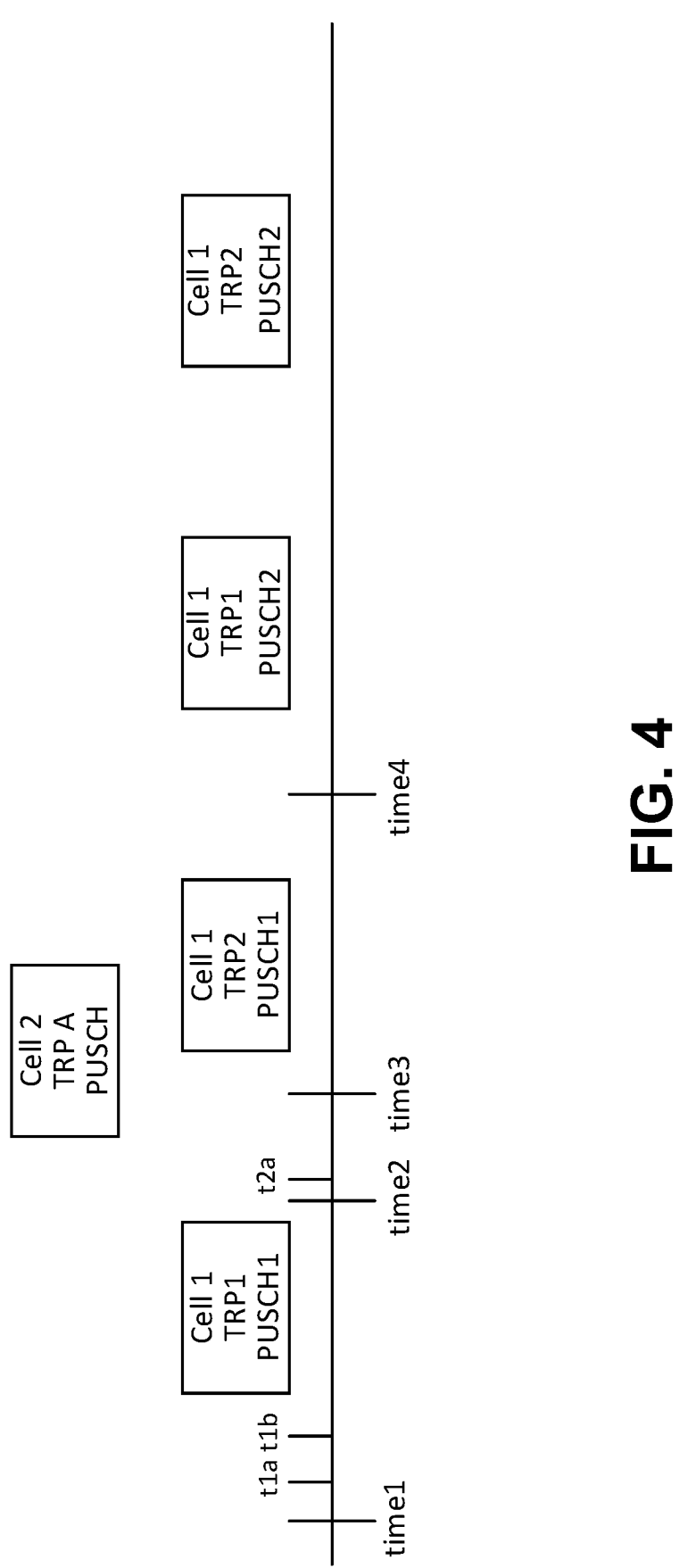
FIG. 4 is a diagram illustrating example transmissions to multiple TRPs and multiple cells.

FIG. 4 is a diagram illustrating example transmissions to multiple TRPs and multiple cells. In an example, shown in FIG. 4, transmissions may be sent to 2 TRPs. In an example, the WTRU may communicate (e.g., may transmit to and/or receive from) a first cell and a second cell. In the examples and embodiments described herein, 2 TRPs and 2 cells are used as a non-limiting examples. Any number of TRPs and cells may be used and still be consistent with this disclosure. In an example, Cell1 TRP1 PUSCH1 and Cell1 TRP2 PUSCH1 may be transmitted by a WTRU based on a 2-TRP grant received for Cell1 or two single TRP grants where one grant is for TRP1 and the other for TRP2. In an example, Cell1 TRP1 PUSCH1, Cell1 TRP2 PUSCH1, Cell1 TRP PUSCH2 and Cell1 TRP PUSCH2 may be transmitted by a WTRU based on a 2-TRP grant with repetition. In an example, TRP1 PUSCH1 and TRP2 PUSCH1 may carry the same TB or different TBs. In an example, PUSCH1 and PUSCH2 may carry the same or different TBs.

In an embodiment, mode determination rules may be specified, for example, as rules that are single or per TRP PHR Report. In an example, a WTRU configured in a mTRP transmission may indicate its capability for reporting more than one PH level. For example, a WTRU may report one PH level per TRP. In an example, a WTRU with the capability of reporting more than one PH level, if configured in a mTRP transmission, may receive a configuration to send a single or multiple PH levels. In an example, a WTRU with the capability of reporting more than one PH level, if configured in a mTRP, may determine the mode of operation for PHR report based on other system parameters or operation mode, characteristics, and/or the like. For example, the mode of operation may be determined based on at least one of the following: Pathloss difference, PHR difference, frequency mapping, intra or inter slot repetition, PUSCH/PUCCH multiplexing, phr-ProhibitTimer, phr-Periodic Timer, mpe-ProhibitTimer and/or initial or retransmission.

In an embodiment, the mode of operation may be determined based on pathloss difference. In an example, a WTRU may be configured with more than one pathloss RS group where each RS group may be used for the purpose of pathloss measurement of a different TRP link, e.g., PL1 and PL2. In an embodiment, a WTRU may determine the mode of the operation based on whether the difference between measured pathloss of each RS group is larger than a fixed or configured threshold. In an example embodiment, a WTRU may determine a single PHR report if the difference between the measured PL1 and PL2 is less than a threshold, otherwise it may determine a per TRP PHR report.

In an embodiment, the mode of operation may be determined based on PHR difference. In an example, a WTRU may be configured to calculate more than one PH level. In an example, the WTRU may determine to report one or more PH levels. In an example, the WTRU may determine to report only one of multiple PH levels. In an embodiment, a WTRU may determine the mode of the operation based on whether the difference between calculated PHR of each RS group is larger than a fixed or configured threshold. In an example embodiment, a WTRU may determine a single PHR report if the different between the calculated PHR1 and PHR2 is less than a threshold, otherwise it may determine a per TRP PHR report.

In an embodiment, the mode of operation may be determined based on frequency mapping. In an example, a WTRU, configured for uplink mTRP transmission, may determine the mode of the operation based on the frequency mapping of each transmission. In an example, a WTRU may determine a single PHR report mode if the frequency separation between the mapping of the scheduled transmissions is less than a threshold where the threshold may be fixed, configured, and/or derived from other system parameters or modes of operation. In an example, a WTRU may determine a per TRP PHR report mode if the frequency separation between the mapping of the scheduled transmissions is larger than a threshold.

In an embodiment, the mode of operation may be determined based on intra or inter-slot repetition. In an example, a WTRU, configured for uplink mTRP transmission, may determine the mode of the operation based on whether the configured mode of repetition is intra- or inter-slot. In an example embodiment, a WTRU may determine a single PHR reporting mode if an inter-slot repetition is used. In another embodiment, a WTRU may determine a single PHR reporting if the configured mode of repetition is inter-slot.

In an embodiment, the mode of operation may be determined based on PUSCH/PUCCH multiplexing. In an example, a WTRU may determine the mode of PHR reporting based on whether a PUCCH payload is multiplexed with a scheduled PUSCH transmission. In an example embodiment, a WTRU may determine a single PHR reporting mode if a PUCCH payload is multiplexed with a scheduled PUSCH transmission. In an example, a WTRU may determine a per TRP PHR reporting mode if a PUCCH payload is multiplexed with a scheduled PUSCH transmission.

In an embodiment, the mode of operation may be determined based on phr-ProhibitTimer. In an embodiment, a WTRU may be configured with more than one phr-Prohibit-Timer, e.g., phr-ProhibitTimer1 and phr-ProhibitTimer2, where each timer may be assigned for transmission to a different TRP, e.g., TRP1 and TRP2. In an example, a WTRU may determine a per TRP PHR report if both phr-ProhibitTimer expire or have expired and/or the pathloss for each link has changed more than a fixed or configured threshold. In an example, a WTRU may determine a per TRP PHR report if both phr-ProhibitTimer expire or have expired and/or when the MAC entity has sufficient UL resources for a new transmission that includes two PHR report. In an example, if the MAC entity does not have sufficient UL resources, a WTRU may determine a single PHR report mode.

In an embodiment, the mode of operation may be determined based on phr-PeriodicTimer. In an example, a WTRU may be configured with more than one phr-Periodic Timer, e.g., phr-Periodic Timer 1 and phr-Periodic Timer2, where, for example, each timer may be assigned for transmission to a different TRP, e.g., TRP1 and TRP2. In an example, a WTRU may determine a per TRP PHR report mode if both of phr-PeriodicTimer expire or have expired.

In an embodiment, the mode of operation may be determined based on mpe-ProhibitTimer. In an example, a WTRU, e.g., a multi-panel WTRU, may be configured with more than one mpe-ProhibitTimer, e.g., mpe-ProhibitTimer1 and mpe-Prohibit Timer2, where each timer may be assigned for transmission to a different TRP, e.g., TRP1 and TRP2. In an example, when mpe-Reporting-FR2 is configured, a WTRU may determine a per TRP 'MPE P-MPR' report mode, if both of the mpe-ProhibitTimer are not running. In an example, if only one of the mpe-Prohibit Timer is not running, a WTRU may determine a single 'MPE P-MPR' report mode. In an example, if a WTRU is configured with mpe-Threshold, the measured P-MPR may be equal to or larger than mpe-Threshold since the last transmission corresponding to a TRP link, and/or the measured P-MPR may be changed more than a configured threshold since the last transmission of a PHR due to the measured P-MPR corresponding to a TRP link.

In an embodiment, the mode of operation may be determined based on initial transmission or retransmission. In an example, a WTRU may be configured to operate in an m TRP simultaneous PUSCH transmission where, for example, each PUSCH payload may correspond to a different MAC entity. In an embodiment, a WTRU may determine the mode of PHR reporting based on whether the PUSCH transmission for each TRP link is corresponding to an initial transmission. In an embodiment, a WTRU may determine a single PHR report if only one of the PUSCH transmission is related to an initial transmission. In an example, a WTRU may determine a multi PHR report if both PUSCH transmissions are related to two new initial transmissions In an embodiment, a multi-transmission/TRP grant may be received before a PHR trigger, for transmission(s) after the trigger. In an embodiment, when a WTRU receives DL control information (e.g., an UL grant) for multiple transmissions (e.g., multi-TRP transmissions or repeated transmissions) on a cell (e.g., an activated serving cell) prior to a PHR trigger that results in one or more PUSCH transmissions after the PHR trigger and/or after the grant (e.g., after the PDCCH monitoring occasion for the grant) is received for the PUSCH that may carry the PHR, the WTRU may consider the DL control information and/or may report at least one real PH associated with the DL control information.

Referring to FIG. 3, in an example, a WTRU may receive a multi-TRP grant, e.g., a 2-TRP grant, for Cell1 at time1. PHR may be triggered at time2. In an example, the WTRU may receive a grant, e.g., a single TRP grant, for Cell2 at time t2a where the resources for TRPA PUSCH may be for new transmission. In an example, the WTRU may include a PHR in a TB, for example in the TRPA PUSCH transmission. In an example, the PHR may include PH information for Cell1 and Cell2. In an example, the WTRU may include a real PH for Cell 2 (e.g., since or when TRPA PUSCH is the PUSCH carrying the PHR). In an example, the WTRU may include a real PH for Cell 1 (e.g., for Cell 1 TRP1 and/or Cell1 TRP2). In an example, the WTRU may consider the multi-TRP grant (e.g., as available) since it was received prior to the PHR trigger for one or more transmissions after the PHR trigger and/or after the grant for the PUSCH (e.g., the TRPA PUSCH) that may carry the PHR.

In an embodiment, when a WTRU receives DL control information (e.g., an UL grant) for multiple transmissions (e.g., multi-TRP transmissions or repeated transmissions) on a cell (e.g., an activated serving cell), the WTRU may consider (e.g., for real PH) grants for transmissions that occur (or begin) at or after a PHR trigger up to the first symbol of the PUSCH transmission that carries the PHR.

In an example, a WTRU may include a real PH in a PHR for a PUSCH transmission corresponding to (e.g., associated with, resulting from, and/or in response to) a grant for multiple TRPs, a grant for a repeated transmission and/or a grant for multiple transmissions when one or more of the following conditions occurs or is satisfied: at least one PUSCH transmission corresponding to the grant begins (or ends) at or after the start (e.g., the first symbol) of a PUSCH (e.g., the first PUSCH) that carries the PHR; at least one PUSCH transmission corresponding to the grant ends (or begins) at or after the end (e.g., the last symbol) of a PUSCH (e.g., the first PUSCH) that carries the PHR; the last PUSCH transmission (e.g., the one latest in time) corresponding to the grant begins (or ends) at or after the start of a PUSCH (e.g., the first PUSCH) that carries the PHR; the last PUSCH transmission (e.g., the one latest in time) corresponding to the grant ends (or begins) at or after the end of a PUSCH (e.g., the first PUSCH) that carries the PHR; and/or, at least one PUSCH transmissions corresponding to the grant is (e.g., is partially or entirely), begins or ends in the same slot as the PUSCH (e.g., the first PUSCH) or at least part of the PUSCH (e.g., the first PUSCH) that carries the PHR.

In an embodiment, the at least one PUSCH transmission corresponding to the grant may be the first PUSCH transmission (e.g., the first PUSCH transmission for the first TRP) corresponding to the grant. In an example, the first TRP may be the one with the earliest resources in time. In an example, the first PUSCH transmission may be the transmission earliest in time. In an example, the at least one PUSCH transmissions corresponding to the grant may be the first PUSCH transmission for the Nth TRP corresponding to the grant which may be an N-TRP grant.

In an embodiment, one or more PUSCH times (e.g., start, end, symbol times) may be adjusted to include or account for processing time (e.g., an amount of processing time) before or after the time. For example, a start (or end) of a PUSCH may be modified to be a time (e.g., a processing time) amount before or after the start (or end) of the PUSCH.

In an example, a PUSCH may be a PUSCH transmission. In an example, if one or more (e.g., all) conditions for including a real PH for a cell or TRP in a PHR is (or are) not satisfied, the WTRU may include a virtual PH or no PH for the cell or TRP in the PHR.

In an example, for the case of an N-TRP grant (e.g., 2-TRP grant), a WTRU may include a real PH in a PHR for a PUSCH transmission corresponding to (e.g., associated with, resulting from, an/or in response to) the grant when one or more of the following conditions occurs or is satisfied: a PUSCH transmission corresponding to the first transmission to or for the Nth TRP begins (or ends) at or after the start (e.g., the first symbol) of a PUSCH (e.g., the first PUSCH) that carries the PHR; a PUSCH transmission corresponding to the first transmission to or for the Nth TRP ends (or begins) at or after the end (e.g., the last symbol) of a PUSCH (e.g., the first PUSCH) that carries the PHR; a PUSCH transmission corresponding to the first transmission to or for the Nth TRP is (e.g., is partially or entirely) or begins or ends in the same slot as the PUSCH (e.g., the first PUSCH) or at least part of the PUSCH that carries the PHR. In an example, a first transmission may be an earliest transmission (e.g., in time).

In an embodiment, shown for example in FIG. 3, Cell1 TRP2 PUSCH1 may be the PUSCH transmission corresponding to the first transmission to the second TRP. In an example, which TRP is the first TRP and which is the second TRP may be based on the order in which the transmissions are sent to the TRPs. In an example, the second TRP may be the one the WTRU transmits to second based on the grant (e.g., the later TRP transmission). In an example, the WTRU may include a real PH for one or more (e.g., each) of the TRPs corresponding to a multi-TRP grant, for example when one or more of the conditions described herein occurs or is satisfied. In an example, a PUSCH that carries a PHR may be at least one of: a first PUSCH that carries a PHR, a PUSCH that carries an initial transmission of a PHR, a PUSCH that carries an initial transmission of a TB and a PHR, and/or a PUSCH that carries an initial transmission of a TB and an initial transmission of a PHR.

In an embodiment, PUSCH may be at least one of: a first PUSCH, a PUSCH that carries an initial transmission, and/or a PUSCH that carries an initial transmission of a TB and/or PHR. In an example, when the WTRU includes a real PH in a PHR for a PUSCH transmission corresponding to (e.g., associated with, resulting from, an/or in response to) a grant for multiple TRPs (e.g., N TRPs where N may be 2), the WTRU may include a real PH for at least one of: each of the N TRPs; the first TRP (e.g., the one with the earliest granted resources); the TRP with granted resources closest to the resources on which the PUSCH with the PHR may be transmitted; and/or, a (e.g., any) TRP for which a PUSCH transmission (e.g., any PUSCH transmission or the first or earliest) PUSCH transmission satisfies a PUSCH transmission conditional event. In an example, a PUSCH transmission may satisfy a PUSCH transmission conditional event when one or more of the following occurs or is satisfied: the PUSCH transmission begins (or ends) at or after the start (e.g., the first symbol) of a PUSCH (e.g., the first PUSCH) that carries the PHR; the PUSCH transmission ends (or begins) at or after the end (e.g., the last symbol) of a PUSCH (e.g., the first PUSCH) that carries the PHR; and/or the PUSCH transmissions is (e.g., is partially or entirely) or begins or ends in the same slot as the PUSCH (e.g., the first PUSCH) or at least part of the PUSCH that carries the PHR.

In an embodiment, the WTRU may include a virtual PH in a PHR for a TRP associated with a multi-TRP grant or for which a multi-TRP grant may be provided when one or more of the following applies: the TRP is not the first TRP associated with the grant; the TRP is not the first TRP associated with the grant and the triggered PHR is not (or does not include) a P-MPR trigger for the TRP; and/or, the P-MPR for the TRP has not changed by more than a threshold (e.g., received or configured threshold), for example since the last time a PHR was sent where the PHR may have included a real PH for the TRP. In an example, a PUSCH transmission (e.g., the first PUSCH transmission) for the TRP corresponding to the multi-TRP grant may not satisfy a PUSCH transmission conditional event.

In an embodiment, MAC-CE enhancements may be made for multi-TPR PHR. In an example, the single PHR MAC-CE may comprise: two octets with a reserved bit; and a PH level field of 6 bits where, for example, the 6 bits may map to one out of 64 PH levels. In an example, the WTRU may report a single PH level. In an example, if PHRs are triggered for two TRPS, and/or both TRPs are in the scheduling grant, then enhancements may be added such that the WTRU may report two real PHRs calculated based on the grant. In an example, the WTRU may report one or both TRPs.

In one embodiment, the single PHR MAC-CE may report the PHRs of both TRPs, and, in an example, the network may interpret it as a multi-TRP MAC-CE. In an example, the single PH level may be reinterpreted as one field representing two separate values. For example, the 6 bits of the PH may be partitioned into two where, for example, the first 3 bits may correspond to TRP1 and map to a set of 32 PH level, and the other 3 bits may correspond to TRP2 and map to a set of 32 PH level. In an example, the WTRU may set the reserved bit to 1 if, for example, the WTRU determines to send a multi-TRP MAC-CE, and the network may interpret a reserved bit of 1 to indicate that, for example, the 6 bits of the PH value may map to the two sets of 32 PH level. In an example, the single PH level may be reinterpreted as one field representing a combination of two PH levels. For example, the WTRU may use the single PH level field to report the weighted average of the two TRP's PH level.

In an embodiment, a separate multi-TRP MAC-CE PHR may be defined with its own logical channel identifier (LCID) where, for example, multiple PH level fields of 6 bits may be configured according to the number of RS groups (i.e. TRPs) configured at the WTRU. In an example, the PH levels may be ordered according to the RS groups configured (i.e. in a fixed ordering that maps one-to-one to the set of TRPs), and/or implicitly derived based on e.g. the ordering of RSs in the DCI. For example, a DCI indicating SRI1 first followed by SRI2 may indicate that SRI1 is for the first TRP and SRI2 for the second TRP; therefore, in an example, the WTRU may order the PH to TRP1 first in the PHR, followed by the PH to TRP2. In an example, there may be a fixed number of PH level fields (e.g. 2), or one per RS group in which case a variable sized MAC-CE PHR may be configured with a different LCID. In an example, a TRP indicator field may be included per TRP in the MAC-CE to identify which TRPs' PH level fields may be reported. In an example, each indicator field may be associated with a PH level field. For example, if the WTRU is configured with 2 TRPs, the MAC-CE may include two TRP indicator fields that may take value of 1 or 0. In an example, if the indicator field value is 1, the PH level field for the associated TRP may be reported; otherwise, no value may be reported. In an example, the WTRU may report real PH for TRPs that have an associated grant; otherwise, the WTRU may report virtual PHs (e.g. for TRPs that may trigger a PHR but may not be in the grant).

In an embodiment, if more than one PHR triggered to multiple TRPs, a WTRU may determine to include a subset of PHRs in the MAC-CE. For example, the WTRU may determine that there are insufficient PUSCH resources to send more than one PHR. In an example, a WTRU may receive a single TRP grant with a single PHR. In an example, then the WTRU may select a subset of PHRs based on one or more of: lowest RS group (or i.e. TRP ID); first SRI in grant; first TRP available to transmit, for example, if the WTRU receives a multi-TRP grant where the WTRU first sends PUSCH to TRP1, and then to TRP2, the WTRU may determine to send the PHR for TRP1; first one that triggered, for example, if the PHR to TRP1 triggers before the PHR to TRP2, then the WTRU may send the PHR associated to TRP1; LCP prioritization, for example, different LCP may be defined for single PHR and multi-PHR MAC-CE, where for example the single PHR MAC-CE may have a higher priority than the multi-PHR; TRPs in the grant, for example, if the WTRU is configured with 3 TRPs that all trigger a PHR, but the grant schedules on TRP1 and TRP2, then the WTRU may prioritize to send PHRs for TRP1 and TRP2, and omit TRP3's PHR.

In an embodiment, if the WTRU receives a single TRP grant and a TRP not in the grant triggers a PHR, the WTRU may include the PHR in the PUSCH transmission of the non-triggering TRP. In an example, an identifier (e.g. RS group index) may be included in the PHR MAC-CE. In an example, the reserved bit field may be toggled when the PHR in the MAC-CE corresponds to the triggering TRP that is not in the grant. In an example, the WTRU may TDM the PHR reports. In an example, the WTRU may send the triggering TRP's PHR that is not in the grant on the next available multi-TRP grant. In an example, the WTRU may send the triggering TRP's PHR that is not in the grant on the next grant to the triggering TRP.

In an example, PHR reporting may be considered in the multi-PUSCH scheduling case. In a scenario, a WTRU may transmit multiple transport blocks (TBs) to multiple TRPs, where the multiple TBs may be scheduled by a single control indication, for example, by a dynamic grant such as a DCI or a configured grant. In an example, this type of scheduling may be referred to as multi-PUSCH scheduling where each PUSCH may contain one TB. In an example, the PUSCH may be sent time domain multiplexed. In an example, the WTRU may receive a dynamic indication of the number of TBs scheduled through a field in the control indication such as, for example, an extended TDRA table where a row of the TDRA table may indicate the timing offset, for example, a start and length indicator value (SLIV) for each TB.

In an example, each TB may be repeated, where each repetition may be transmitted to a different TRP. For example, a WTRU may receive a control indication scheduling 2 TBs with 2 repetitions. In an example, the WTRU may transmit TB1 with 2 repetitions where repetition 1 may be sent to TRP1 with spatial filter SRI1, and repetition 2 may be sent to TRP2 with spatial filter SRI2. In an example, the WTRU may transmit TB2 with repetition 1 to TRP1 with spatial filter SRI1, and/or repetition 2 to TRP2 with spatial filter SRI2.

In an example, the WTRU may receive a configuration with two sets of power control parameters where, for example, each set may be associated with an SRS targeting a TRP, and/or each TB sent by the WTRU to a TRP may use the respective power control parameters of the TRP. In an example, the WTRU may determine the power control parameters for each TRP associated to the SRI. For example, the power control parameters may be configured in the SRS-Config for each SRS resource set or SRS resource ID. In an example, the indication of power control parameters may be dynamically indicated through, for example, a DCI with one or more TPC commands, or preconfigured parameters including open loop power control parameters such as P0, alpha, or a combination of both.

In an embodiment, a WTRU may be triggered to report a multi-TRP multi-PUSCH PHR when it receives a multi-PUSCH scheduling grant, which may include multiple SRIs, and/or when one of the PHR triggering conditions is met (e.g. pathloss difference). In an example, the multiple SRIs may be preconfigured, or may be dynamically indicated (e.g. in a DCI). In an example, a WTRU may measure pathloss on reference signals associated to SRIs in the same set, where, for example, the set may be associated to a TB. For example, TB1 may be associated with SRI1 and SRI2. In an example, in the first grant, a WTRU may send TB1 with SRI1, and/or in a second grant, a WTRU may send TB1 with SRI2. In an example, then, the WTRU may measure the pathloss difference between pathloss RSs associated to SRI1 and SRI2, and/or may trigger a PHR if the pathloss difference is above a threshold. In an example, a WTRU may transmit using one SRI for multiple TBs. For example, SRI1 may be used for TB1 and TB2 where TB1 and TB2 may be transmitted in different time instances. In an example, if the WTRU receives a single grant which may indicate the same resource allocation for TB1 and TB2 (e.g. frequency resources such as number of PRBs), then the WTRU may calculate and report one real PHR for both TBs. In an example, if the single grant indicates different resource allocation for TB1 and TB2, then the WTRU may calculate and may report two different PHRs where, for example, each PHR may be for a TB.

In one solution, the WTRU may determine the power control and spatial filter parameters to use per TB and per repetition using a mapping between SRIs to TBs. In an example, the mapping may be a dynamic indication in the DCI or a configuration (e.g. as part of the PUSCH-Config IE). In an example, the mapping may indicate an association between a TB index and an SRI or between a repetition of a TB index and an SRI. In an example, the WTRU may determine that the mapping is 1-to-1 between a TB and an SRI. In an example, the WTRU may use a different SRI for each TB. For example, the WTRU may send repetition 1 and 2 with SRI1, where SRI1 may be sent to TRP1. In an example, the WTRU may use a similar mapping for the repetition of TB2 using SRI2. For example, the WTRU may transmit TB2 where repetition 1 and 2 may be sent with SRI2.

Figure 5:
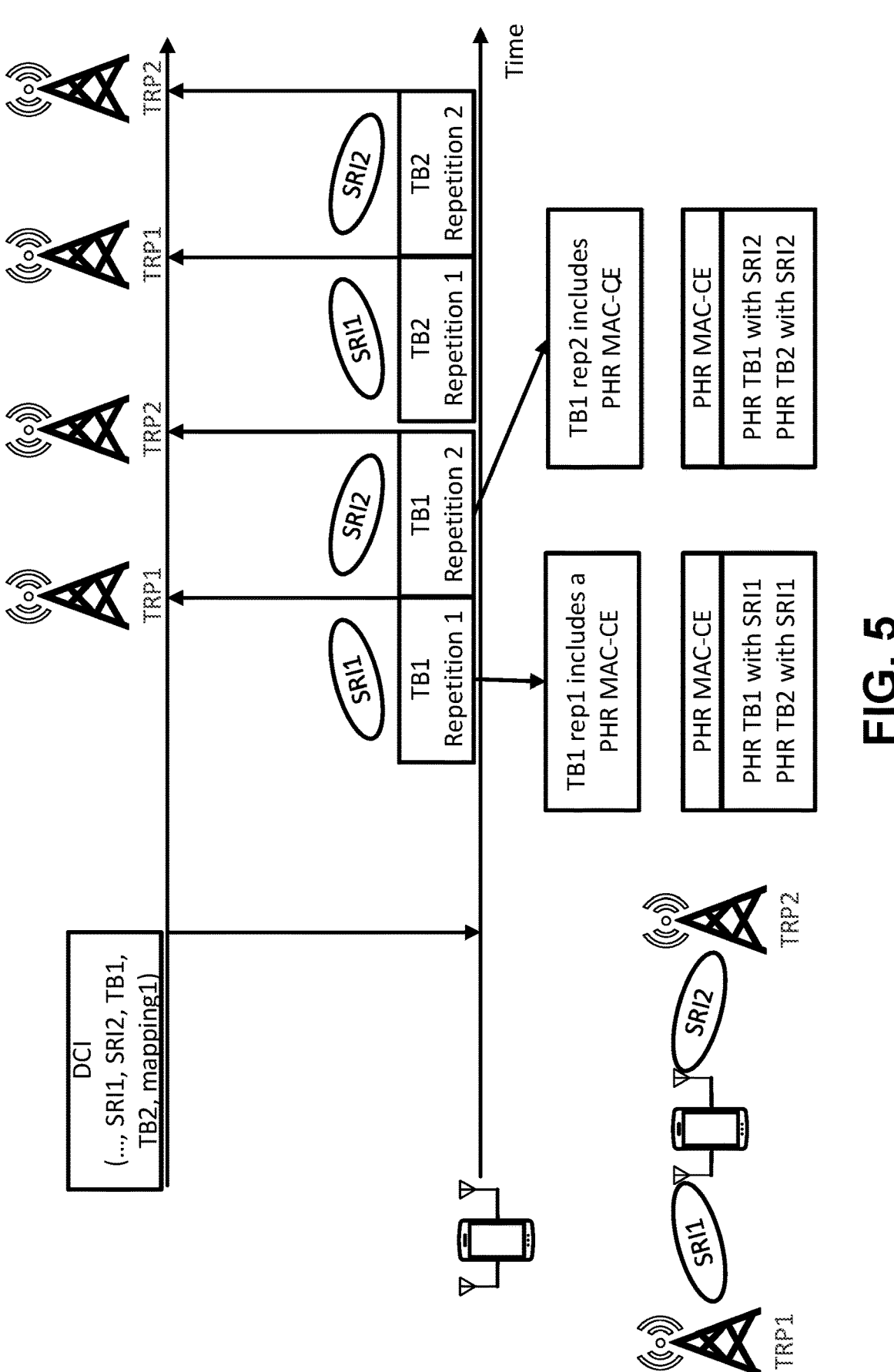
FIG. 5 is a diagram illustrating an example of a reception of a control signal comprising a mapping configuration indicating that a first service request indicator (SRI) and a second SRI are mapped to a first and second repetition respectively.

FIG. 5 is a diagram illustrating an example of a reception of a control signal containing a mapping configuration. In an example, a mapping configuration may indicate that a first SRI and a second SRI may be mapped to a first and second repetition, respectively. In an example, the WTRU may determine that one TB may use multiple SRIs. In an example, the same mapping may apply to all TBs in the grant. For example, as shown in FIG. 5, a WTRU may receive a control signal containing mapping1. In an example, the WTRU may determines that SRI1 and SRI2 may be mapped to repetition 1 and 2 of a TB, respectively. In an embodiment, a WTRU may receive a separate mapping for each TB (e.g. mapping1 and mapping 2). For example, a WTRU may transmit repetition 1 and 2 of TB1 with SRI1, and repetition 1 of TB2 may be mapped to SRI1, and repetition 2 of TB2 to SRI2.

In an embodiment, a WTRU may determine that the resource set of SRIs for each TB may be different. For example, TB1 may use a first resource set of (SRI1, SRI2), and TB2 may use a second resource set of (SRI3, SRI4). In an example, the resource sets of different TBs may share some SRIs, or may be distinct.

In one embodiment, a WTRU may calculate a PHR per SRI for each TB. In an example, the WTRU may report the PHR values associated to the same TB in the same PHR MAC-CE. In an example, as shown in FIG. 5, the WTRU may calculate PHRs and may include PHRs in the first occasion of an associated SRI. In an example, the WTRU may include in repetition 1 of TB1 the PHRs of TB1 and TB2, which may be calculated with the power control parameters associated to SRI1. In an example, in the second repetition, the WTRU may report the PHRs of TB1 and TB2 with SRI2. In an example, the WTRU may transmit TB2 without requiring overhead for a MAC-CE.

In an embodiment, if multiple SRIs are associated/configured to a TRP, a WTRU may prioritize the PHR to be included in the MAC-CE. In an example, a WTRU may calculate and report a subset of PHR values, which may correspond to, e.g., a subset of triggered SRIs and/or TBs. In an example, the MAC-CE may be of variable length. In an example, the MAC-CE may include a header where, for example, the subset of reported PHR values may be indicated. For example, the WTRU may determine to include PHRs based on earliest triggered, based on the SRI index, based on the TB index, and/or based on a combination of criteria. For example, if the WTRU is configured with 3 SRIs to TRP1, and SRI1 and SRI2 triggered before SRI3, then the WTRU may include PHRs for SRI1 and SRI2. Alternatively or in combination, as an example, the WTRU may include PHR for SRI3 if, for example, SRI3 is higher priority (e.g. TB with SRI3 is a TB for URLLC or high priority traffic), and/or the PHRs may be associated to TB1 if TB1 is higher priority.

In an embodiment, a WTRU may determine to send one PHR report per TB. In an example, the WTRU may include one or multiple PHR values in the PHR report, where, for example, the number of PHR values per TB may be determined based on the number of SRIs mapped to a TB. In an example, the WTRU may determine to send the PHR either in repetition index i (e.g. the WTRU sends a PHR in repetition i of the TB), in the first or last repetition, or with the repetition associated to an SRI (i.e. TRP) (e.g. the WTRU sends a PHR in the transmission with the repetition that uses SRI1). For example, if the WTRU sends TB1 with two repetitions, and both repetitions use SRI1, then the WTRU may calculate and may report one PHR value. In an example, if one repetition uses SRI1 and the other uses SRI2, then the WTRU may calculate and report two PHR values where each may be associated with an SRI. In an example, the WTRU may report both values in one PHR MAC-CE in the first repetition of TB1.

In an example, if PHRs are triggered for both SRIs, the WTRU may calculate and may report two real PHR values per TB, for example, based on the grant information received in the control signal. In an example, if only one of the SRIs is triggered, the WTRU may calculate and may report a real PHR value for the TB to the triggered SRI, and may report a virtual PHR value for the non-triggered SRI. In an example, the WTRU may calculate and may report a single PHR for the triggered SRI and/or for the non-triggered SRI. In an example, the WTRU may calculate and may report a single PHR only for the triggered SRI.

In an embodiment, a WTRU may determine to send one report to a TRP where, for example, the report may include one or more PHR values corresponding to one or more TBs. For example, a WTRU may send TB1 with SRI1, and TB2 with SRI2 where TB1 and TB2 may be scheduled with a single grant (i.e. multi-PUSCH scheduling). In an example, if the PHR triggers before the grant, or triggers up to the transmission of PUSCH, then the WTRU may include the PHR values for SRI1 and for SRI2 in a single PHR.

In an example, the WTRU may determine to include the PHR in the transmission occasion, for example, where a PUSCH with a specific SRI may be used (e.g. PHR may be included in a first transmission of a TB using SRI1). In an example, the WTRU may determine the next occasion where it may be scheduled with SRI1, and may include the multiple PHRs in the corresponding TB that may be sent with SRI1.

In an example, the WTRU may include the PHR in the transmission which may be associated with a TB index (e.g. PHR may be included in a first transmission with an SRI used to sending TB1). In an example, the WTRU may determine the next occasion where it is scheduled with TB1, and may include the multiple PHRs of the SRIs in TB1.

In an embodiment, PHR reporting rules and UL behaviors for STxMP may be specified. In an example, one or more antenna panels may be used, implemented, and/or determined to be used for a WTRU. In an example, each antennal panel may be associated with a RS group (e.g., RS group ID, a WTRU panel ID, a PL RS group (per TRP), a SRS resource set, and/or a CORESET group ID, etc.). Herein, the antenna panel may be interchangeably used with panel, WTRU antenna panel, WTRU panel, RS group, RS group ID, WTRU panel ID, PL RS group, SRS resource set, and CORESET group ID and still be consistent with the disclosure.

In an example, a WTRU panel may correspond to a transmission entity in which an independent power control and/or timing control may be applicable. In an example, a WTRU panel may comprise one or more antennas (e.g., antenna arrays, antenna ports, antenna elements). In an example, a WTRU panel may be (e.g. dedicatedly) used for either transmission or reception. In an example, a WTRU panel may be used for both transmission and reception purposes (e.g., selectively for one purpose at a time).

In an example, when a WTRU employs, supports, or is equipped with multiple panels, the WTRU may perform transmission/reception with multiple antenna panels. In an embodiment, the WTRU may perform transmission/reception with multiple antenna panels based on a one or more modes of operation. In an example, the WTRU may perform transmission/reception with multiple antenna panels based on a first mode of operation. For example, in the first mode of operation, a single WTRU panel may be activated and used at a time. In an example, the other WTRU panels may be deactivated which may reduce WTRU power consumption. In an example, a certain amount time may be required to activate a deactivated WTRU panel. In an example, the first mode of operation may be referred to as a 'UL Transmission from Single WTRU Panel' (TxSP) Mode 1.

In an example, the WTRU may perform transmission/reception with multiple antenna panels based on a second mode of operation. For example, in the second mode of operation, multiple WTRU panels may be activated (and keep activated), but a UL transmission can be performed from a single panel at a time. In an example, a WTRU panel for UL transmission may be selected or determined dynamically. For example, a WTRU panel index or a beam associated with any WTRU panel may be indicated in a DCI scheduling an uplink transmission. In an example, fast beam switching across WTRU panels may be achieved, while, for example, requiring moderate WTRU power consumption. In an example, the second mode of operation may be referred to as a 'UL Transmission from Single WTRU Panel' (TxSP) Mode 2.

In an example, the WTRU may perform transmission/reception with multiple antenna panels based on a third mode of operation. For example, in a third mode of operation, multiple WTRU panels may be activated (and keep being activated), and one or more WTRU panels may be used for UL transmission at the same time. In an example, simultaneous Tx from multiple WTRU panels (to multiple reception points, e.g., TRPs) may be possible to boost UL performance and/or reliability. In an example, higher UL Tx performance and efficiency may be achieved while, for example, requiring higher complexity and/or higher WTRU power consumption. In an example, the third mode of operation may be referred to as a 'Simultaneous UL Transmission from Multiple WTRU Panels' (STxMP) Mode. In an example, the third mode of operation may be disabled by the gNB when the WTRU enters limited power mode, for example due to power class limitations. In an example, this is signaled by at least a TRP related PHR=0, or the global PH levels over all UL simultaneous transmissions may indicate a power limited scenario. In an embodiment, the WTRU may perform transmission/reception with multiple antenna panels based on, but not limited to, one or more of the above modes of operation.

In an embodiment, a mode of operation for a UL transmission with multiple WTRU panels may be determined based on one or more of: WTRU capability; higher layer configuration; dynamic indication; and implicit determination. In an embodiment, a mode of operation for a UL transmission with multiple WTRU panels may be determined based on WTRU capability. For example, a WTRU may indicate its supported mode of operation. In an example, if the supported mode of operation includes a single mode of operation, the indicated mode of operation may be used. In an example, if the supported mode of operation includes more than one mode of operation, the WTRU may be indicated which mode of operation to use. In an embodiment, a mode of operation for a UL transmission with multiple WTRU panels may be determined based on higher layer configuration. For example, a WTRU may be configured with a mode of operation (e.g., TxSP Mode 1, TxSP Mode 2, STxMP Mode) via RRC or MAC-CE. In an embodiment, a mode of operation for a UL transmission with multiple WTRU panels may be determined based on dynamic indication. In an example, a WTRU may be indicated which mode of operation to use for a UL transmission by a scheduling DCI. In an example, the number of beams (e.g., SRIs, CRIs, or TCI states) indicated in the DCI may be determined based on the mode of operation determined. For example, when TxSP Mode 1 or TxSP Mode 2 is used for a UL transmission, a single beam (e.g., SRI, CRI, or TCI state) may be indicated. For example, when TxSP Mode 1 or TxSP Mode 2 is not used for a UL transmission, more than one beam information may be provided in the scheduling DCI. For example, when TxSP Mode 1 or TxSP Mode 2 is used for a UL transmission, a single beam (e.g., SRI, CRI, or TCI state) may be indicated. the indication may be an explicit bit field in the DCI. In an example, the indication may be an RNTI scrambled with CRC of the DCI. In an example, a first RNTI may be used if a first mode of operation is used; a second RNTI may be used if a second mode of operation is used; and so forth. In an example, a mode of operation may be associated with a DCI format. For example, WTRU may monitor one or more DCI formats. In an example, if a WTRU received an uplink grant via a first DCI format, a first mode of operation may be used; if the WTRU received an uplink grant via a second DCI format, a second mode of operation may be used; and so forth.

In an embodiment, a mode of operation for a UL transmission with multiple WTRU panels may be determined based on implicit determination. In an example, a WTRU may be configured with a set of beams for UL transmission (e.g., TCI state set, SRI set, CRI set), wherein, for example, the WTRU may be indicated with a beam within the set of beams via a DCI. In an example, if the set of beams includes beams associated with a single panel, the WTRU may perform or determine a first mode of operation (e.g., TxSP Mode 1). In an example, if the set of beams include beams associated with multiple panels, the WTRU may perform or determine a second mode of operation (e.g., TxSP Mode 2 or STxMP Mode). In an example, a WTRU may perform or determine a first mode of operation (e.g., TxSP Mode 2 or STxMP Mode) if the WTRU is configured with a priority indicator in a DCI (e.g., for URLLC traffic support). In an example, a WTRU may perform or determine a second mode of operation (e.g., TxSP Mode 1) if the WTRU is not configured with a priority indicator in a DCI (e.g., for URLLC traffic support).

In an embodiment, PH may be calculated, derived, estimated, or determined per TRP if a UL transmission targets multiple TRPs. In an embodiment, one or more of following example scenarios may apply: PH may be independently/separately determined per TRP; PH for a TRP may be reported periodically or based on event-based triggering; and one or more PH types may be used. In an example scenario, PH may be independently/separately determined per TRP. For example, a first PH may be determined for a first TRP based on a measurement of a reference signal associated with the first TRP and a second PH may be determined for a second TRP based on a measurement of a reference signal associated with the second TRP. In an example scenario, PH for a TRP may be reported periodically or based on event-based triggering. In an example scenario, one or more PH types may be used. In an example, using a first PH type, PH may be determined per TRP (e.g., for TxSP Mode); hereafter, for example, it may be referred to as PH_TxSP. In an example, using a second PH type, PH may be determined for multiple TRPs (e.g., for STxMP Mode); hereafter, for example, it may be referred to as PH_STxMP.

In an embodiment, when a STxMP mode is used, determined, or enabled, a WTRU may be configured to determine a PH_STxMP based on transmission power allocated for all beams. For example, PH_STxMP may be determined based on the following equation: P_max−f(P_PUSCH #1, P_PUSCH #2, . . . ), where, for example, P_max (e.g., Pc_max) may be a maximum (allowable) transmission power for the WTRU, P_PUSCH #1 may be a first power value (determined based on a power control) corresponding to a scheduled PUSCH to be transmitted from a first WTRU panel or WTRU Panel1 (e.g., to a first TRP), P_PUSCH #2 may be a first power value (determined based on a power control) corresponding to a scheduled PUSCH to be transmitted from a second WTRU Panel or WTRU Panel2 (e.g., to a second TRP), and so on. In an example, f(.) may be a function that may be configured (or pre-defined, or pre-determined) to the WTRU.

In an embodiment, f(.) may be determined based on one or more of following examples scenarios. In an example scenario, f(.) may be an addition of all the simultaneously transmitted PUSCH power values, for example, when a STxMP-PUSCH is scheduled to the WTRU. In an example, the STxMP-PUSCH may be scheduled to be transmitted from one or more WTRU panels, e.g., from both WTRU Panel1 and WTRU Panel2. In an example, the PHR_STxMP may be P_max−(P_PUSCH #1+P_PUSCH #2). In an example, the P_max may correspond to the summation of maximum (allowable) transmission power values for all (activated) WTRU panel(s).

In an example scenario, f(.) may be an averaging function, e.g., f(.)=avg(.), of all the simultaneously transmitted PUSCH power values, for example, when a STxMP-PUSCH is scheduled to the WTRU. In an example, the STxMP-PUSCH may be scheduled to be transmitted from one or more WTRU panels, e.g., from both WTRU Panel1 and WTRU Panel2. In an example, the PHR_STxMP may be P_max−avg(P_PUSCH #1, P_PUSCH #2). In an example, avg(P_PUSCH #1, P_PUSCH #2) may be (P_PUSCH #1+P_PUSCH #2)/2. In an example, the P_max may correspond to the average of maximum (allowable) transmission power values for all (activated) WTRU panel(s).

In an example scenario, f(.) may be a weighted-averaging function of all the simultaneously transmitted PUSCH power values, for example, when a STxMP-PUSCH is scheduled to the WTRU. In an example, the STxMP-PUSCH may be scheduled to be transmitted from one or more WTRU panels, e.g., from both WTRU Panel1 and WTRU Panel2. In an example, the PHR_STxMP may be P_max−(a*P_PUSCH #1+b*P_PUSCH #2)/2, where the gNB may configure/indicate a first coefficient value of a (to be weighted on PUSCH #1) and a second coefficient value of b (to be weighted on PUSCH #2), and so on. In an example, the P_max may correspond to the weighted average (e.g., using the same configured/indicated weighting coefficients of a and b, . . . ) of maximum (allowable) transmission power values, for example, for one or more (activated) WTRU panel(s). In an example, the P_max may correspond to the weighted average (e.g., using the same configured/indicated weighting coefficients of a and b, . . . ) of maximum (allowable) transmission power values, for example, for all (activated) WTRU panel(s). In an example, the weighting coefficients of a and b may be updated, for example, based on an indication from the gNB, e.g., via a MAC-CE message or a DCI, based on gNB's efficient network-operational strategy on WTRU power management across multiple WTRU panels.

In an embodiment, PHR for STxMP may be performed. In an embodiment, one or more PHR types may be used, wherein each PHR type may be associated with a PH type. For example, a first PHR type may be correspond to a reporting of a first PH type; a second PHR type may be correspond to a reporting of a second PH type, and so on. In an example, one or more of the following example scenarios may apply.

In an example scenario, a PH type may be determined based on one or more of following: the number of TRPs used or assumed for a PH determination; the number of UE panels used or assumed for a PH determination; the number of beams used or assumed for a PH determination; the number of carriers/bandwidth parts (BWPs) used or assumed for a PH determination; and the number of PL values used or assumed for a PH determination. In an example, a PH type may be determined based on the number of TRPs used or assumed for a PH determination. For example, a first PH type may be associated with a single TRP to determine PH and a second PH type may be associated with more than one TRP. PH type may be determined based on the number of WTRU panels used or assumed for a PH determination. For example, a first PH type may be associated with a UL transmission using a single UL panel at a time (e.g., TxSP Mode) and a second PH type may be associated with a UL transmission using multiple UL panels at a time (e.g., STxMP). In an example, a PH type may be determined based on the number of beams used or assumed for a PH determination. In an example, a PH type may be determined based on the number of carriers/bandwidth parts (BWPs) used or assumed for a PH determination. In an example, a PH type may be determined based on the number of PL values used or assumed for a PH determination. For example, a first PH type may use a single PL value to determine a PH while a second PH type may use more than one PL value to determine a PH.

In an example scenario, a WTRU may trigger a PHR based on one or more conditions and the one or more conditions may be determined based on the PHR type. In an example, a first set of conditions may be configured, used, or determined for a first PHR type and a second set of conditions may be configured, used, or determined for a second PHR type. In an example, a set of conditions may include one or more of the following and each condition/parameter may be independently configured or determined for a set of conditions: periodicity (e.g., expiry of a timer); threshold of the PL gap (e.g., PL value change since the last time a PHR was transmitted); a threshold as PL delta (PL difference) between two UL beams; threshold of the power backoff; threshold of P-MPR. In an example, a set of conditions may be commonly used irrespective of the PHR type. In an example, one or more conditions/parameters may be configured independently for a PHR type.

In an embodiment, the gNB may configure an independent threshold parameter (Thres_PH_STxMP) for PHR reporting for STxMP, for example, separately from a threshold parameter (Thres_PH_TxSP) for PHR reporting for TxSP. In an example, if a first estimated pathloss value (for TxSP from WTRU panel1) changes over the Thres_PHR_TxSP, the WTRU may transmit PHR1 (e.g., from WTRU panel1). In an example, if a second estimated pathloss value (for TxSP from WTRU panel2) changes over the Thres_PHR_TxSP, the WTRU may transmit PHR2 (e.g., from WTRU panel2), and so on. In an example, if a third estimated pathloss value (for STxMP from both WTRU panel1 and WTRU panel2) changes over the Thres_PHR_STxMP, the WTRU may transmit PHR_STxMP (e.g., from both WTRU panel1 and WTRU panel2) and so on. In an example, the third estimated pathloss value may be determined based on f(the first estimated pathloss value, the second estimated pathloss value, . . . ) in which f(.) may be a function that may be configured (or pre-defined, or pre-determined) to the WTRU, which may be an addition, an averaging function, a weighted-averaging function, and/or the like.

In an embodiment, the gNB may configure an independent threshold parameter for PL difference (Delta_Thres_PH_STxMP) for PHR reporting. In an example, if the pathloss estimate difference between two beams, the WTRU may trigger an PHR report following the rules explained herein for the PHR type (e.g. real, virtual or a composite).

In an embodiment, the gNB may configure/indicate a time window value (e.g., a time duration value) within which the third estimated pathloss value may be calculated based on f(the first estimated pathloss value, the second estimated pathloss value, and so on). In an example, the maximum time difference for WTRU to obtain one or more of the first estimated pathloss value, the second estimated pathloss value, and so on, may be no larger than the time window value, so that, for example, the third estimated pathloss value may not be obtained as being outdated. In an example, the maximum time difference for WTRU to obtain all the first estimated pathloss value, the second estimated pathloss value, and so on, may be no larger than the time window value, so that the third estimated pathloss value may not be obtained as being outdated. In an example, the time window value may be pre-defined or pre-determined.

In an embodiment, a triggering of PHR for STxMP may be performed. In an example, a WTRU may trigger PHR of one or more of PHR types at a time. In an example, PHR types may include one or more of: a first PHR type (e.g., PHR for STxMP Mode, PHR_STxMP); a second PHR type (e.g., PHR for TxSP Mode, PHR1, PHR2); a third PHR type (e.g., PHR for a WTRU with a single antenna panel, PHR), and/or the like.

In an embodiment, a WTRU may be indicated to report a set of PHR types if one or more following conditions are met: a triggering condition is met for at least one of the PHR type within the set of PHR types; one or more of predetermined conditions is met; a dynamic indication is met.

In an example, a WTRU may trigger a set of PHR types if a triggering condition is met, for example, if the set of PHR types includes a first PHR type and a second PHR type and a triggering condition for the first PHR type is met, a WTRU may trigger PHR for the first and second PHR types although the second PHR type doesn't meet a triggering condition. In an example, the set may be configured via a higher layer signaling. In an example, the set may be determined based on WTRU panel configuration (e.g., number of panels, mode of operation, etc.)

In an example, a WTRU may trigger a set of PHR types based on one or more of predetermined conditions, wherein the predetermined condition may comprise at least one of following: a mode of operation used within a time window; a worst (or best) case of PHR; a preferred mode of operation. In an example, a WTRU may trigger a set of PHR types based on one or more of predetermined conditions, wherein the predetermined condition may comprise a mode of operation that may be used within a time window. For example, if a WTRU may be scheduled with a first mode of operation (e.g., TxSP Mode) and a second mode of operation (e.g., STxMP) within a time window (e.g., last X ms), the WTRU may trigger PHR for the first PHR type and second PHR type. In an example, if the WTRU may be scheduled with a first mode of operation within the time window, the WTRU may trigger PHR for the first PHR type. Herein, for example, the triggering PHR may be periodic (e.g., expiry of a timer).

In an example, a WTRU may trigger a set of PHR types based on one or more of predetermined conditions, wherein the predetermined condition may comprise a worst (or best) case of PHR. For example, if a WTRU triggers PHR and multiple PHR types are triggered at the same time, the WTRU may perform PHR for a single PHR type (e.g., best case or worst case), wherein the best case may be that the power headroom may have a largest value and the worst case may be that the power headroom may have a smallest value, or vice-versa. In an example, a WTRU may trigger a set of PHR types based on one or more of predetermined conditions, wherein the predetermined condition may comprise a preferred mode of operation. For example, if a WTRU prefers a STxMP Mode based on a measurement, the WTRU may trigger PHR for the PHR type associated with the STxMP Mode. For example, if the WTRU prefers a TxSP Mode based on a measurement, the WTRU may trigger PHR for the PHR type associated with TxSP Mode. In an example, the PHR may include information related the PHR type associated with the triggered PHR. In an example, the preferred mode of operation may be determined based on channel quality, PL, PH level, WTRU power saving level, traffic type, and/or required QoS.

A WTRU may trigger a set of PHR types based on a dynamic indication. For example, gNB may indicate (e.g., via DCI) to report one or more PHR types, wherein the indication includes which PHR types to report and its associated uplink resource information for the triggered PHR.

In an embodiment, the gNB may indicate (or configure) for the WTRU to report a combination of {PHR1, PHR_STxMP} in a UL time instance (e.g., a UL slot, a UL symbol). For example, it may have benefits that the gNB may selectively compare remaining power budgets for the WTRU between PHR1 and PHR_STxMP (but not necessary to compare with PHR2, based on various reasons, e.g., channel quality from WTRU panel2 is low, and/or an estimated Rx interference on a UL signal from WTRU panel2 is high).

In an embodiment, the WTRU may be allowed (e.g., be configured) to determine the combination, e.g., as a WTRU-oriented/initiated scheme. In an example, the WTRU may compare two or more (or a configured/indicated set of) PH levels of {PHR_STxMP, PHR1, PHR2, and the like}, and may determine to report a combination of {PHR1, PHR_STxMP} in the UL time instance, e.g., based on a pre-configured (or pre-defined) condition/rule. In an example, the WTRU may compare all the (or a configured/indicated set of) PH levels of {PHR_STxMP, PHR1, PHR2, and the like}, and determine to report a combination of {PHR1, PHR_STxMP} in the UL time instance, e.g., based on a pre-configured (or pre-defined) condition/rule. In an example, the WTRU may determine one or more of estimated pathloss values, for example, for PHR1 and PHR_STxMP change over Thres_PHR_TxSP and Thres_PHR_STxMP, respectively. In an example, an estimated pathloss value for PHR2 may not change over Thres_PHR_TxSP. In an example, the WTRU may determine both of estimated pathloss values for PHR1 and PHR_STxMP change over Thres_PHR_TxSP and Thres_PHR_STxMP, respectively, but an estimated pathloss value for PHR2 may not change over Thres_PHR_TxSP.

In an example, the gNB may indicate (or configure) for WTRU to report a combination of {PHR1, PHR2, PHR_STxMP} in a UL time instance (e.g., a UL slot, a UL symbol). In an example, it may have benefits, for example, that the gNB may selectively compare remaining power budgets for the WTRU, for example, between PHR1, PHR2, and PHR_STxMP, to determine which UL transmission from the WTRU may be the best, for example, in terms of gNB's efficient network-operational strategy considering various factors (e.g., wireless channel quality, UL interference estimated at the gNB, and the like).

In an example, the WTRU may be allowed (e.g., be configured) to determine the combination, e.g., as a WTRU-oriented/initiated scheme. In an example, the WTRU may compare two or more (or a configured/indicated set of) PH levels of {PHR_STxMP, PHR1, PHR2, and the like}, and may determine to report a combination of {PHR1, PHR2, PHR_STxMP} in the UL time instance, e.g., based on a pre-configured (or pre-defined) condition/rule. In an example, the WTRU may compare all the (or a configured/indicated set of) PH levels of {PHR_STxMP, PHR1, PHR2, and the like}, and determine to report a combination of {PHR1, PHR2, PHR_STxMP} in the UL time instance, e.g., based on a pre-configured (or pre-defined) condition/rule. In an example, the WTRU may determine estimated pathloss values for PHR1, PHR2, and PHR_STxMP change over Thres_PHR_TxSP, Thres_PHR_TxSP, and Thres_PHR_STxMP, respectively.

In an example, an independent/separate Thres_PHR_TxSP may be configured (or pre-determined) per WTRU panel (e.g., per RS group, per RS group ID, per WTRU panel ID, per PL RS group (per TRP), per SRS resource set, and/or per CORESET group ID). In an example, PHR1 may be calculated based on Thres_PHR_TxSP1, and PHR2 may be calculated based on Thres_PHR_TxSP2.

The following describes examples of UL behavior in relation to PHR reporting on STxMP. In an embodiment, a PHR reporting type (e.g., among PHR1, PHR2, or PHR_STxMP) may be implicitly determined based on a UL transmission (e.g., a PUSCH transmission, the most recent PUSCH transmission).

In an example, the gNB may schedule a first PUSCH for WTRU to transmit from WTRU Panel1. In an example, the WTRU may transmit the first PUSCH in a first time instance. In an example, the WTRU may determine, after the first time instance, that the PHR reporting type may be to report PHR1 (e.g., where the WTRU determines PHR1 only, not for PHR2/PHR_STxMP) until the type may be changed further. In an example, the PHR reporting type (e.g., for PHR1) may be determined based on the most recent PUSCH transmission case (e.g., the first PUSCH). In an example, benefits for the PHR reporting type determination may be overhead and, for example, latency reduction on control signaling to indicate the PHR reporting type.

In an example, the gNB may schedule may be a second PUSCH for WTRU to transmit as STxMP (e.g., from both WTRU Panel1 and WTRU Panel2). In an example, the WTRU may transmit the second PUSCH in a second time instance. In an example, the WTRU may determine, after the second time instance, that the PHR reporting type may be to report PHR_STxMP (e.g., where the WTRU calculate PHR_STxMP only, not for PHR1/PHR2) until the type may be changed further. In an example, the PHR reporting type (e.g., for PHR_STxMP) may be determined based on the most recent PUSCH transmission case (e.g., the second PUSCH). In an example, benefits for the PHR reporting type determination may be overhead and, for example, latency reduction on control signaling to indicate the PHR reporting type.

In an embodiment, the BS may independently configure (e.g., activate, indicate) to report a combination of PHR types (e.g., among PHR_STxMP, PHR1, PHR2, and the like) either periodically or via an aperiodic reporting triggering, while a PHR reporting type may remain active (e.g., based on the implicit PHR reporting type determination). In an example, benefits may be for gNB to figure out other PH levels when needed, for example other than the currently being used PHR reporting type at the WTRU, (e.g., in order to determine the next UL scheduling for the WTRU from a different UL panel(s), e.g., with a WTRU panel switching).

In an embodiment, a DCI (e.g., for scheduling a PUSCH) may not comprise a UL panel selection indication. In an example, the UL panel selection may be determined based on the latest (or current) PHR reporting type (e.g., among PHR_STxMP, PHR1, PHR2, . . . ) for the WTRU. In an example, if the current PHR reporting type is to report PHR1, the DCI scheduling a first PUSCH may implicitly indicate that the first PUSCH is to be transmitted from UL panel1. In an example, if the current PHR reporting type is to report PHR_STxMP, a second DCI scheduling a second PUSCH may implicitly indicate that the second PUSCH may be transmitted from UL panel2. In an example, benefits may be to control overhead reduction on (explicitly) indicating which UL panel to use for transmission of a UL signal, where, for example, the UL panel selection may depend on the PHR reporting type. In an example, the gNB may (explicitly) indicate/update a PHR reporting type (e.g., among PHR_STxMP, PHR1, PHR2, . . . ).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples.

Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like.

Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶16 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S. C. § 112, ¶16, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) comprising a memory and processor, the memory and processor configured to:

send capability information indicating that the WTRU is configured to support simultaneous multi-panel (SMP) transmission;

determine that a power headroom report (PHR) has been triggered;

receive downlink control information (DCI) comprising uplink grant information, the DCI indicating a multi-panel (MP) mode of operation;

determine power headroom (PH) values for the PHR, wherein the PH values comprise a first PH value for a panel associated with a single panel PHR trigger and a second PH value associated with SMP operation, and wherein the PH values are determined based on at least the multi-panel mode of operation indicated in the DCI and whether the PHR was triggered based on an SMP pathloss (PL) determination; and send the PHR comprising the PH values.

2. The WTRU of claim 1, wherein an SMP PL value is determined based on a weighted average of PLs associated with the SMP transmission.

3. The WTRU of claim 1, wherein the PHR trigger is based on at least the single panel PHR trigger or a difference between a current SMP PL value and a last SMP PL value being above a threshold.

4. The WTRU of claim 1, wherein the MP mode of operation comprises single active panel, dynamic panel selection, and SMP.

5. The WTRU of claim 1, wherein the PHR comprising the PH values further comprises a SRS Resource Indicator (SRI) mapping to transport blocks (TBs) and joint reporting of multiple PHRs for multiple PHRs or SRIs.

6. The WTRU of claim 1, further configured to trigger rules per reference signal (RS) group for multi-TRP based on at least one of PL, P-MPR, and PL difference between RS groups.

7. The WTRU of claim 1, wherein sending the PHR is based on intra- and inter-cell cases, wherein the intra and inter-cell cases comprise: an multiple Transmission and Reception Points (mTRP) mode determination, a single vs multiple PH level reporting, and medium access control-control element (MAC-CE) enhancements.

8. The WTRU of claim 1, wherein the PHR is in a simultaneous UL multi-panel (STxMP) transmission to a multiple Transmission and Reception Point (mTRP).

9. A method performed by a Wireless Transmit/Receive Unit (WTRU), the method comprising:

sending capability information indicating that the WTRU is configured to support simultaneous multi-panel (SMP) transmission;

determining that a power headroom report (PHR) has been triggered;

receiving downlink control information (DCI) comprising uplink grant information, the DCI indicating a multi-panel (MP) mode of operation;

determining power headroom (PH) values for the PHR, wherein the PH values comprise a first PH value for a panel associated with a single panel PHR trigger and a second PH value associated with SMP operation, and wherein the one or more PH values are determined based on at least the multi-panel mode of operation indicated in the DCI and whether the PHR was triggered based on an SMP pathloss (PL) determination; and sending the PHR comprising the PH values.

10. The method of claim 9, wherein an SMP PL value is determined based on a weighted average of PLs associated with the SMP transmission.

11. The method of claim 9, wherein the PHR trigger is based on at least a single panel PHR trigger or a difference between a current SMP PL value and a last SMP PL value being above a threshold.

12. The method of claim 9, wherein the MP mode of operation comprises single active panel, dynamic panel selection, and SMP.

13. The method of claim 9, wherein the PHR comprising the PH values further comprises a SRS Resource Indicator (SRI) mapping to transport blocks (TBs), and joint reporting of multiple PHRs for multiple PHRs or SRIs.

14. The method of claim 9, further comprising triggering rules per reference signal (RS) group for multi-TRP based on at least one of PL, P-MPR, and PL difference between RS groups.

15. The method of claim 9, wherein sending the PHR is based on intra- and inter-cell cases, wherein the intra and inter-cell cases comprise: an multiple Transmission and Reception Points (mTRP) mode determination, a single vs multiple PH level reporting, and medium access control-control element (MAC-CE) enhancements.

* * * * *